Jan. 25, 1938.  J. W. BRYCE  2,106,476
ACCOUNTING MACHINE
Filed May 7, 1932  17 Sheets-Sheet 1
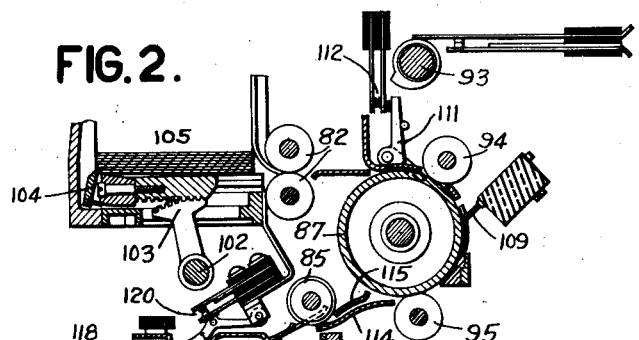
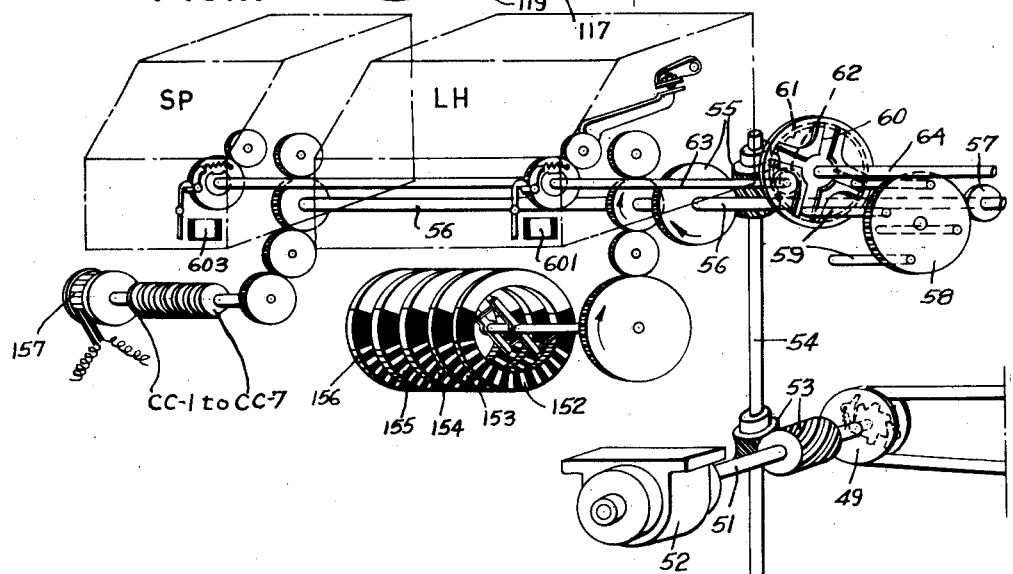
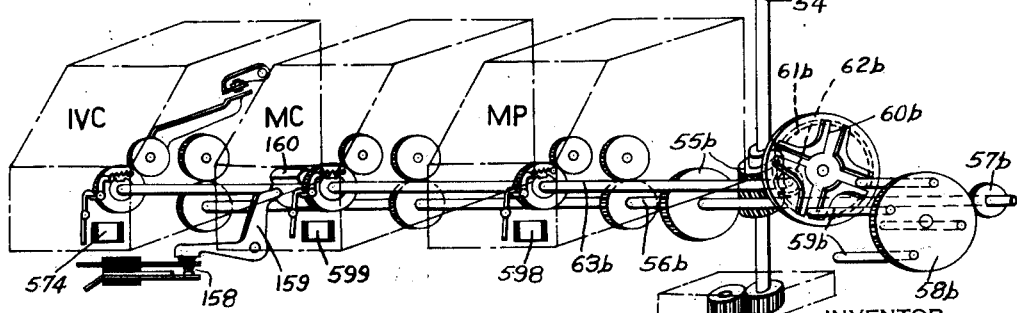
INVENTOR
James W. Bryce
BY
Cooper, Kerr & Dunham
ATTORNEYS Jan. 25, 1938.  J. W. BRYCE  2,106,476
ACCOUNTING MACHINE
Filed May 7, 1932  17 Sheets-Sheet 2
FIG.1a.
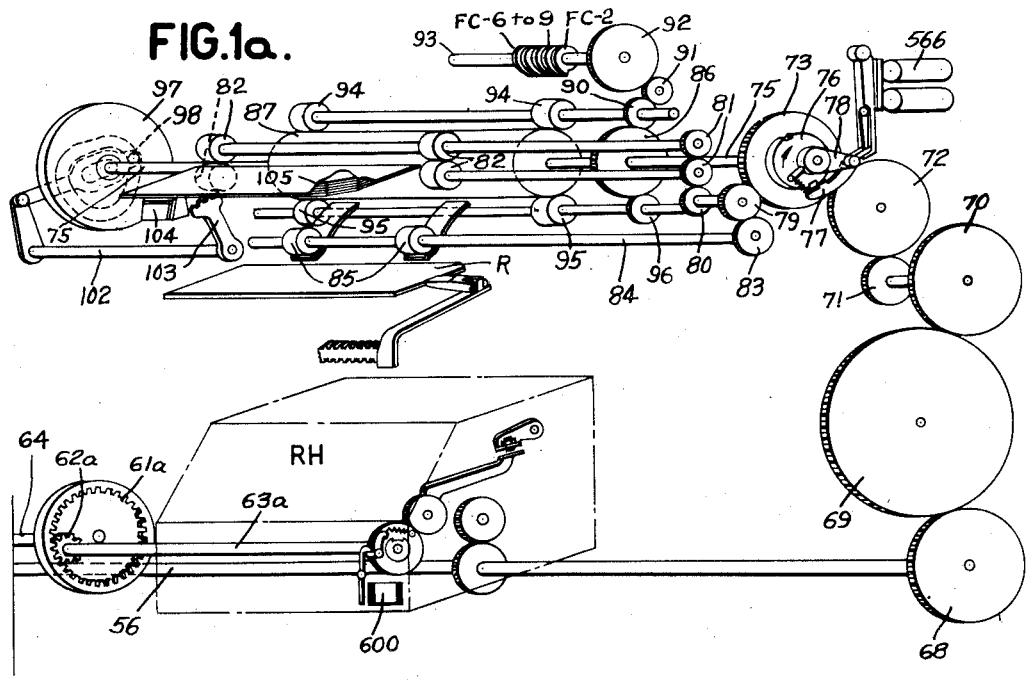
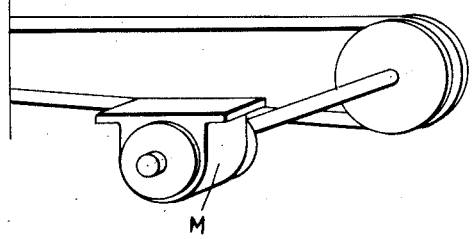
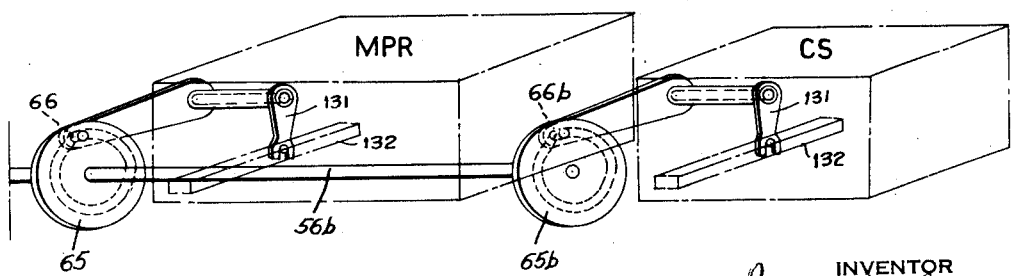

Jan. 25, 1938. J. W. BRYCE 2,106,476
ACCOUNTING MACHINE
Filed May 7, 1932 17 Sheets-Sheet 3
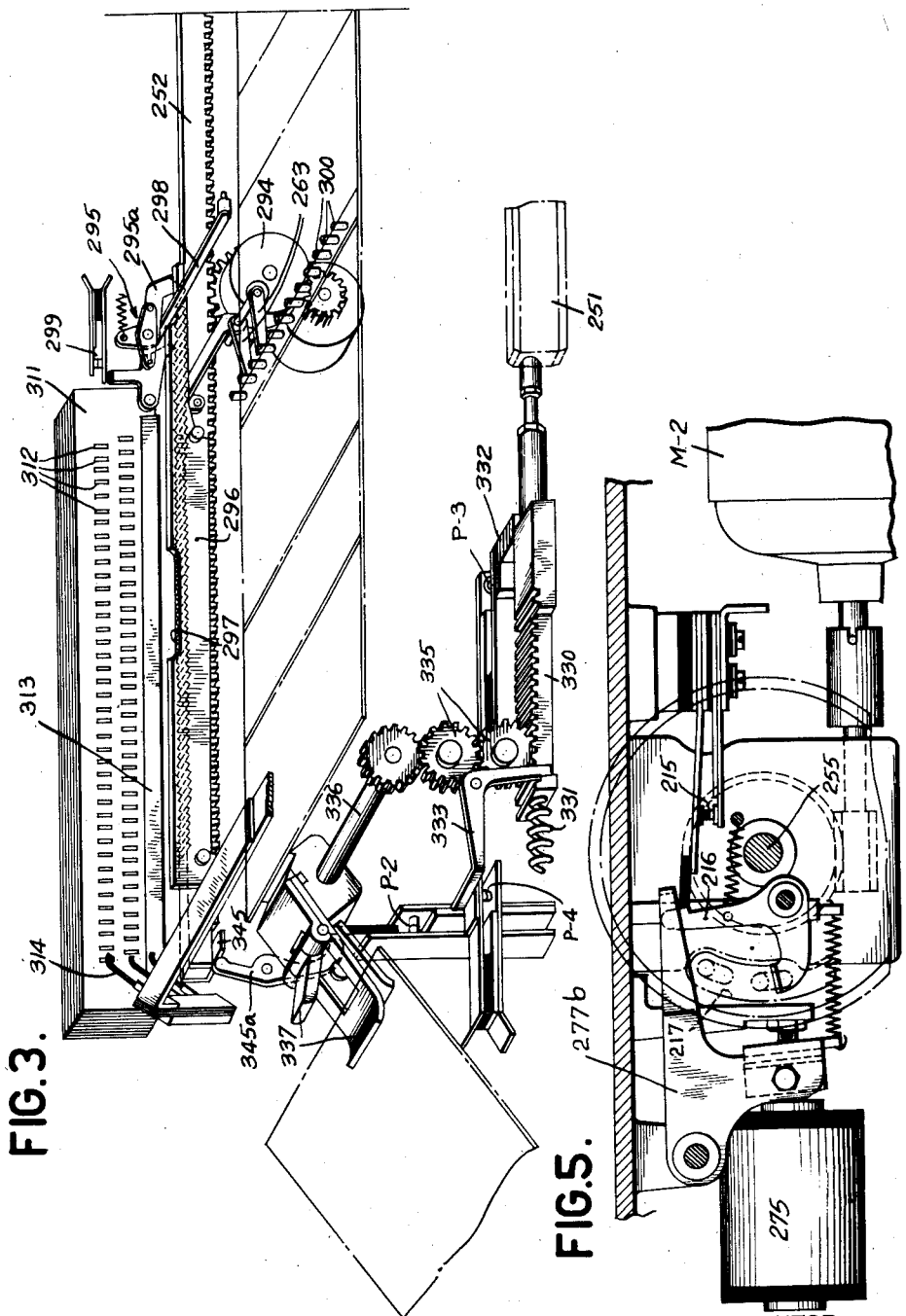
INVENTOR
James W. Bryce
BY
Cooper, Kerr & Dunham
ATTORNEYS

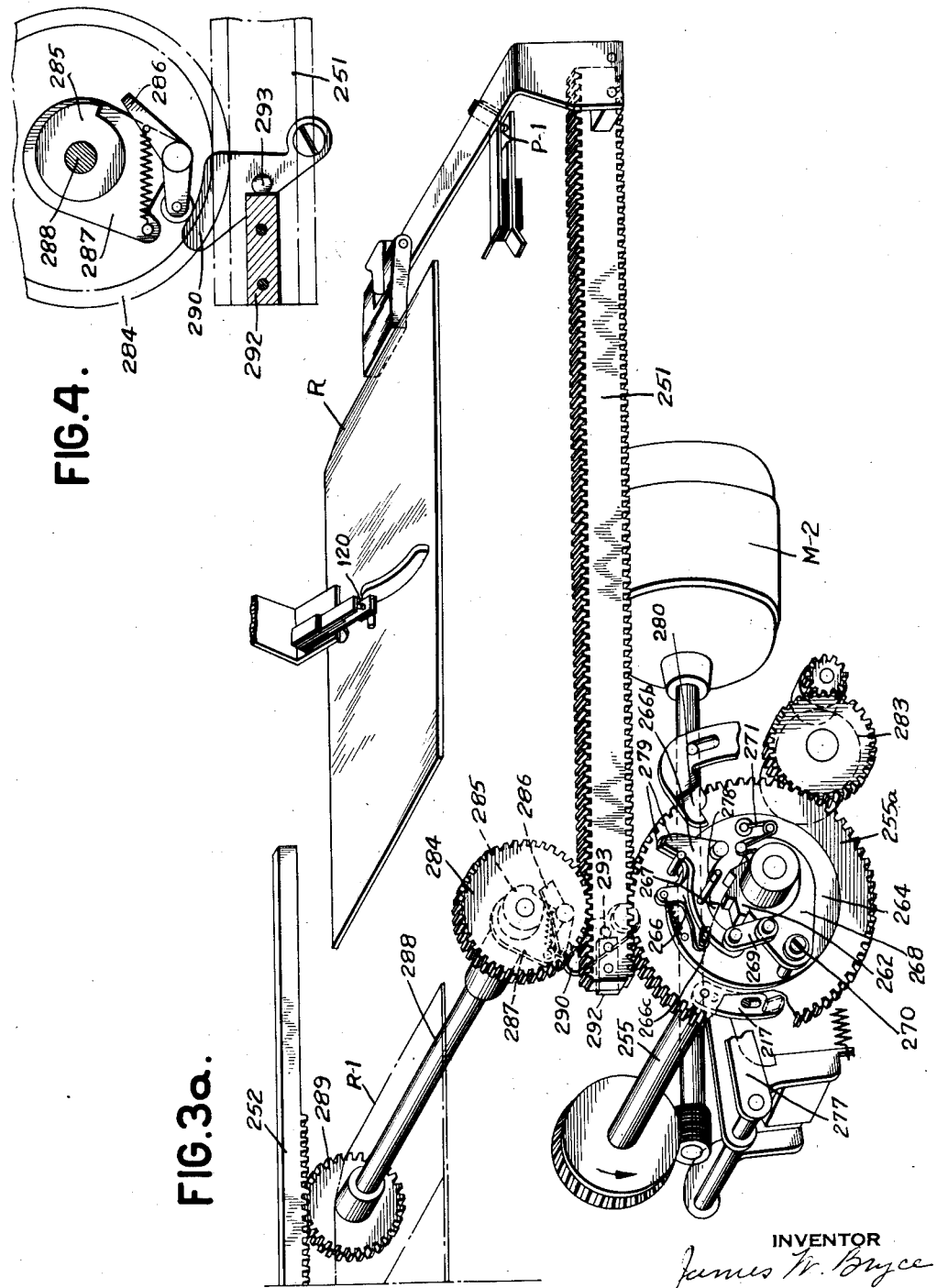

Jan. 25, 1938.   J. W. BRYCE   2,106,476
ACCOUNTING MACHINE
Filed May 7, 1932   17 Sheets-Sheet 5
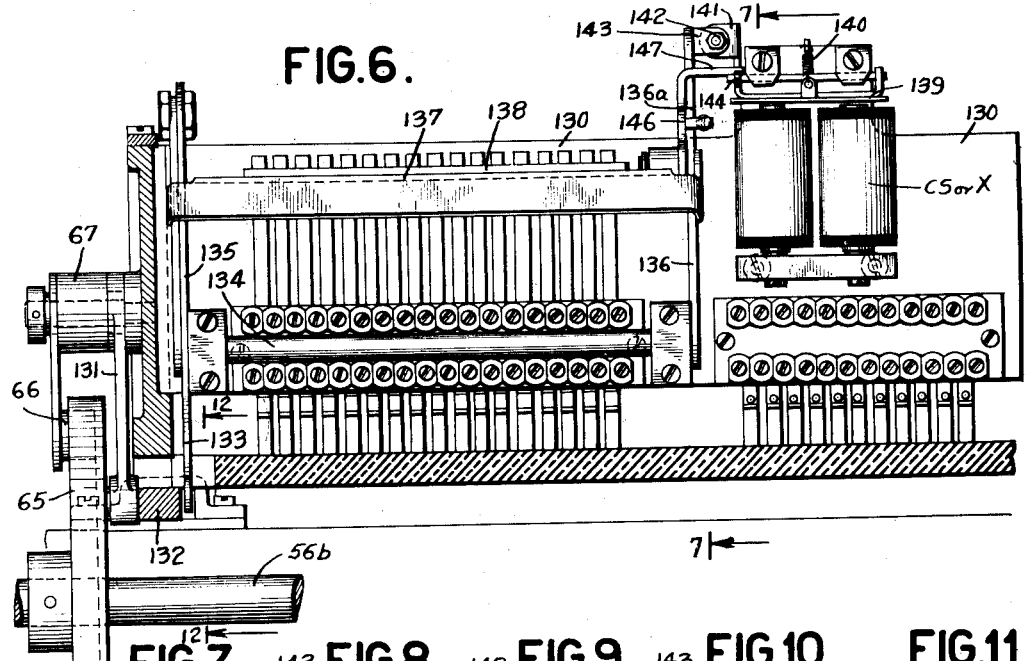
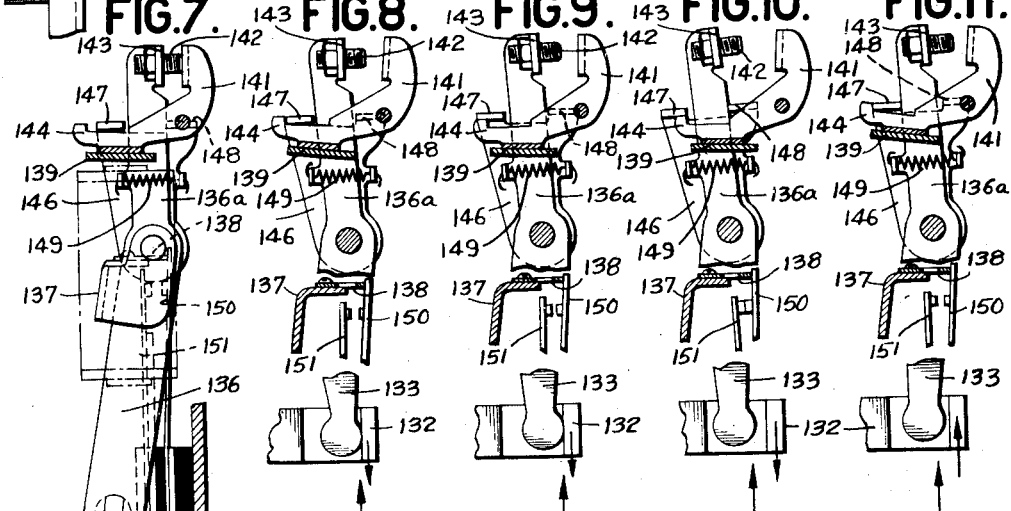
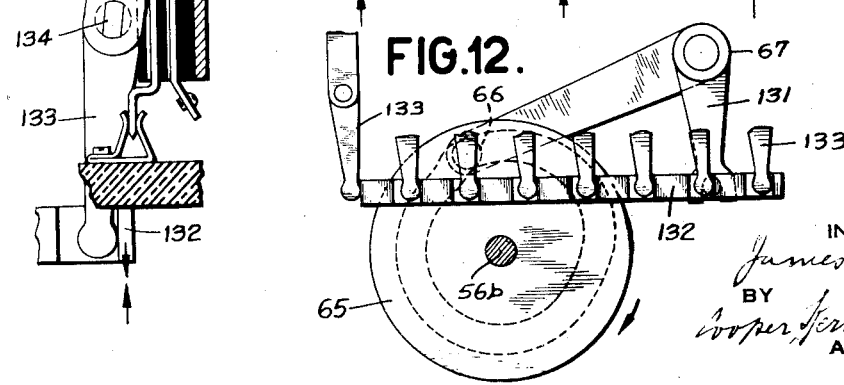
INVENTOR
James W. Bryce
BY
Cooper, Kerr & Dunham
ATTORNEYS Jan. 25, 1938.   J. W. BRYCE   2,106,476
ACCOUNTING MACHINE
Filed May 7, 1932   17 Sheets-Sheet 6
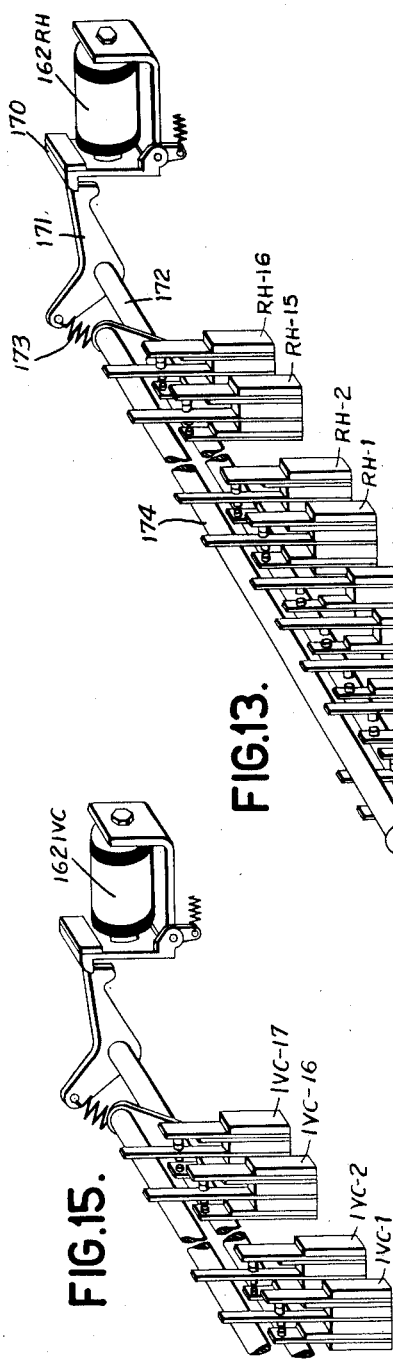
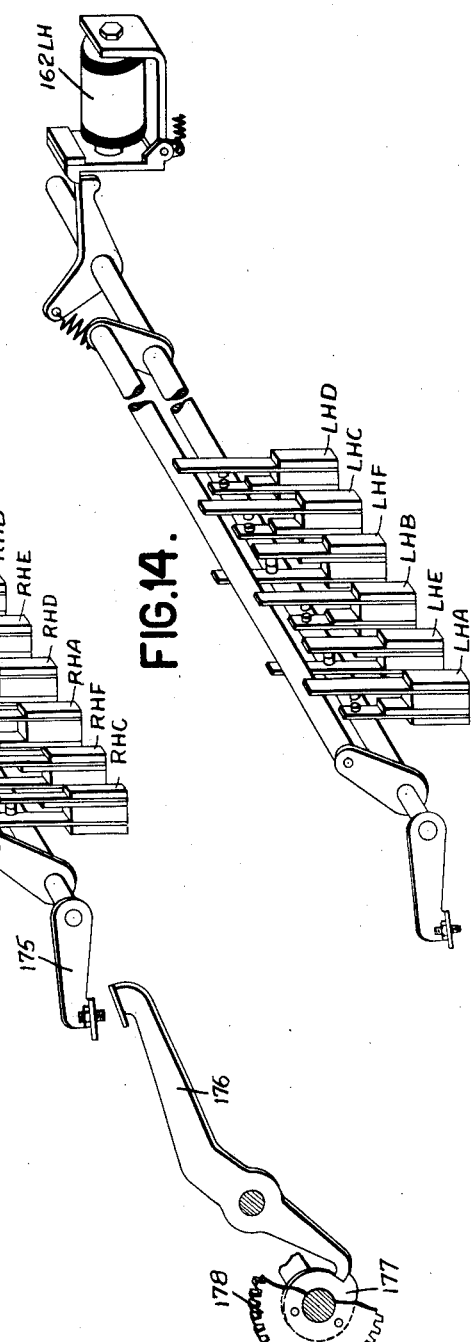
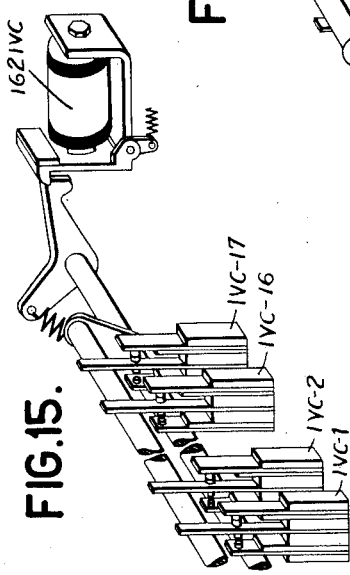
INVENTOR
James W. Bryce
BY
Cooper, Kerr & Dunham
ATTORNEYS Jan. 25, 1938. J. W. BRYCE 2,106,476
ACCOUNTING MACHINE
Filed May 7, 1932 17 Sheets-Sheet 7
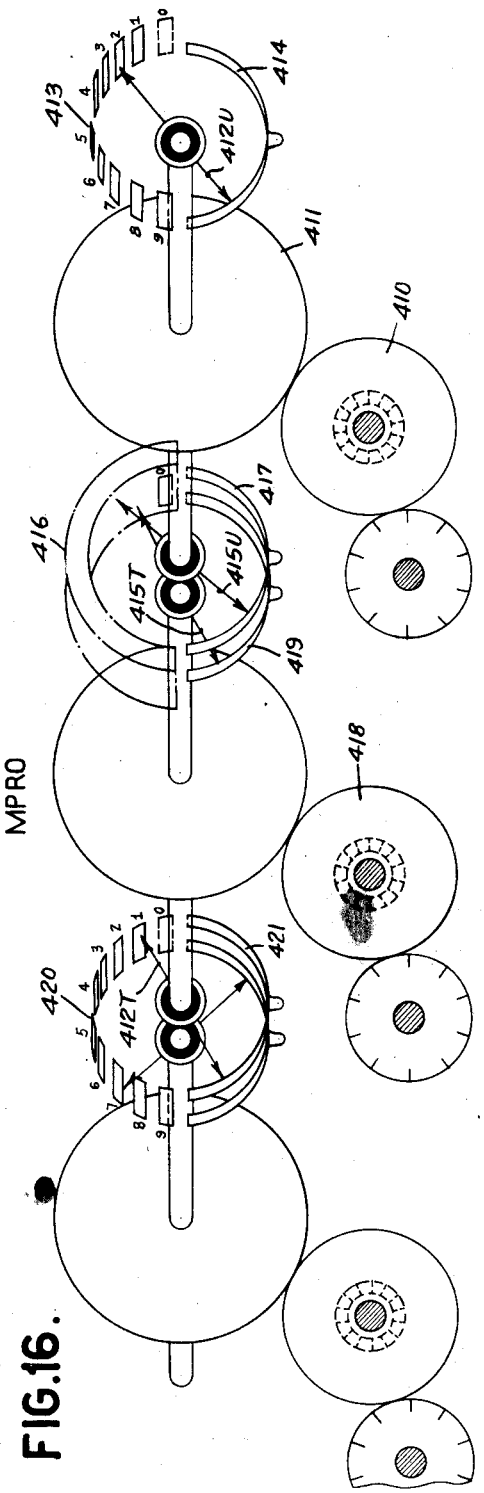
FIG.16. FIG.17. FIG.18.
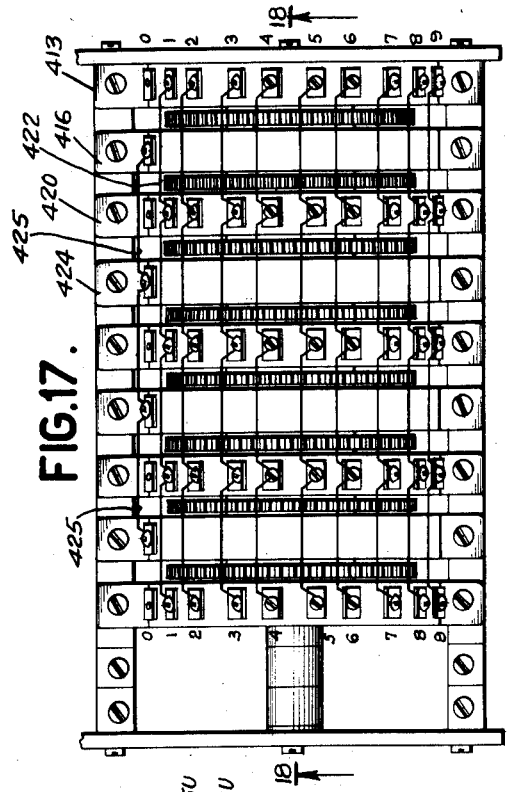
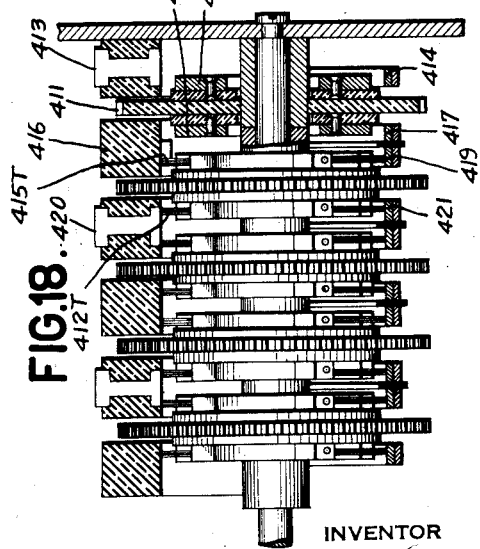
INVENTOR
James W. Bryce
BY
Cooper, Kerr & Dunham
ATTORNEYS Jan. 25, 1938.  J. W. BRYCE  2,106,476
ACCOUNTING MACHINE
Filed May 7, 1932  17 Sheets-Sheet 8
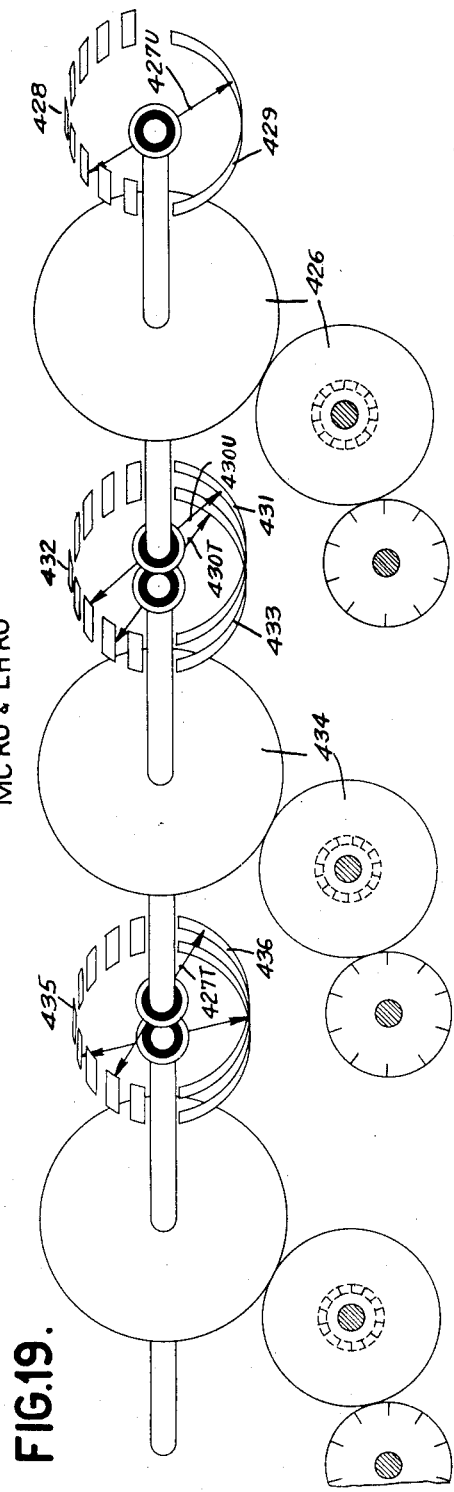
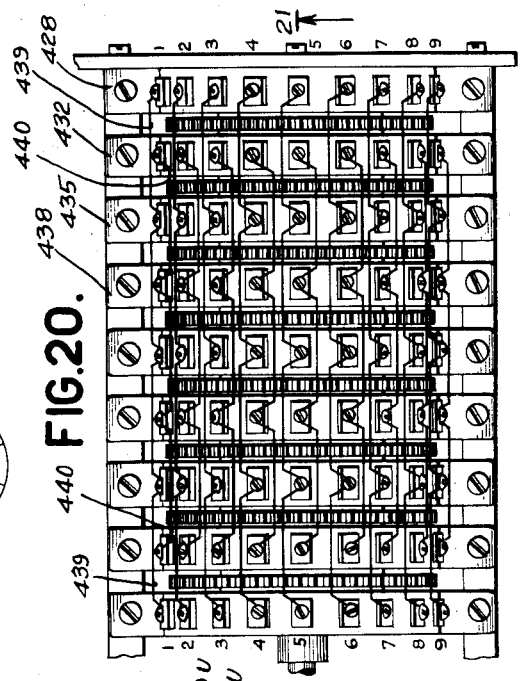
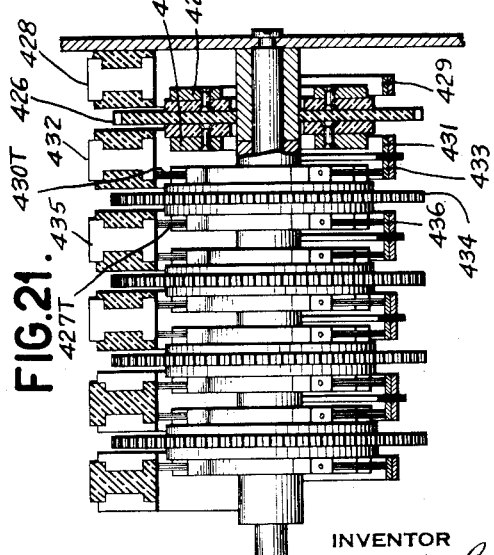
INVENTOR
James W. Bryce
BY
ATTORNEYS Jan. 25, 1938. J. W. BRYCE 2,106,476
ACCOUNTING MACHINE
Filed May 7, 1932 17 Sheets-Sheet 9
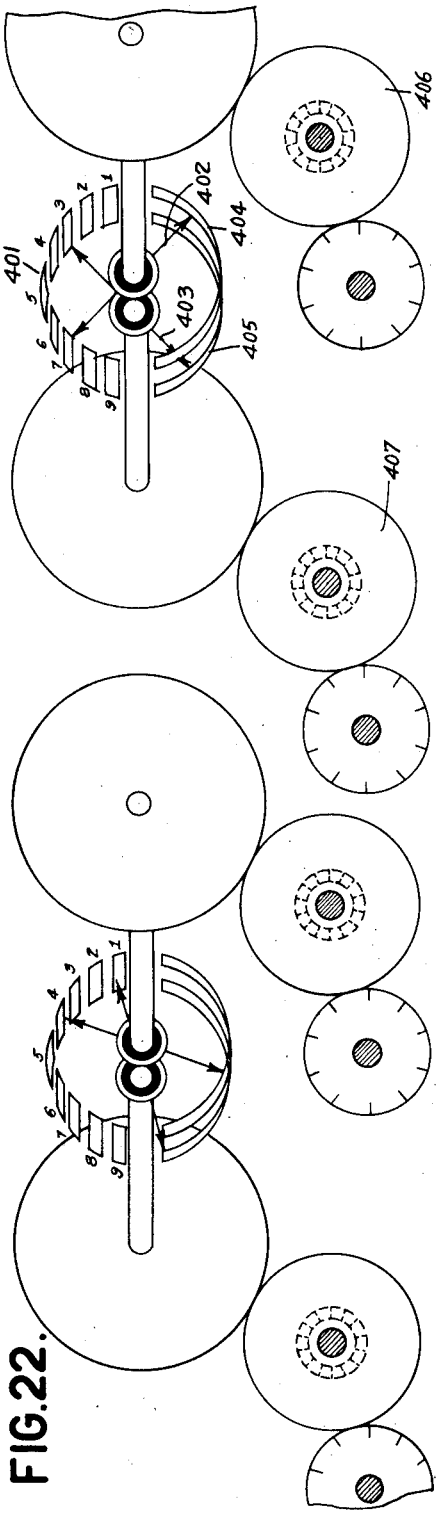
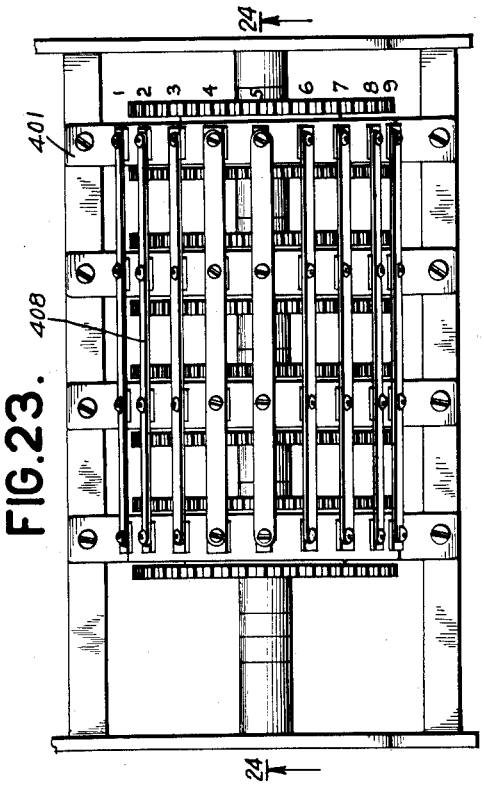
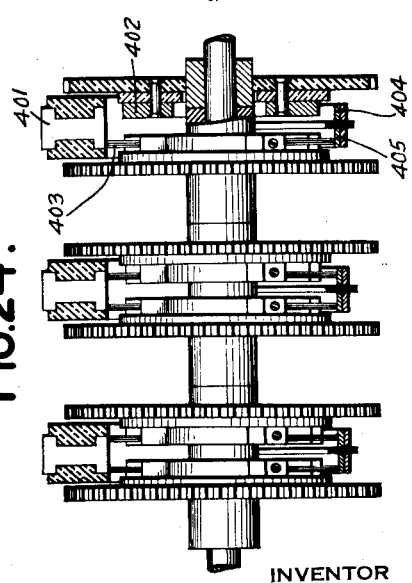
INVENTOR
James W. Bryce
BY
Cooper, Kerr & Dunham
ATTORNEYS Jan. 25, 1938.     J. W. BRYCE     2,106,476
ACCOUNTING MACHINE
Filed May 7, 1932     17 Sheets-Sheet 10
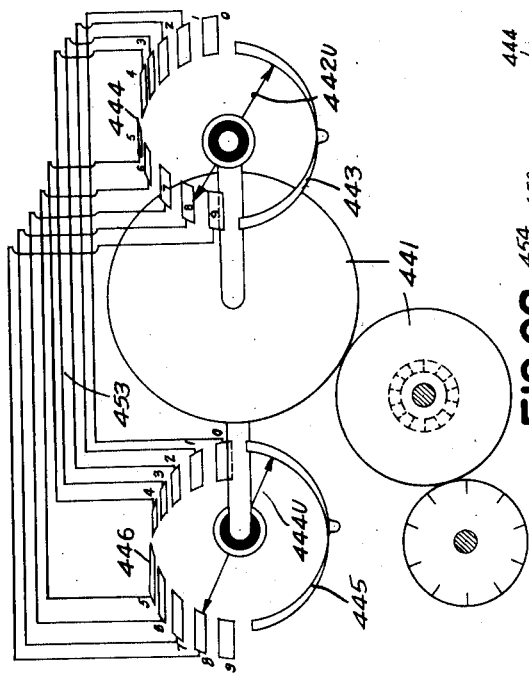
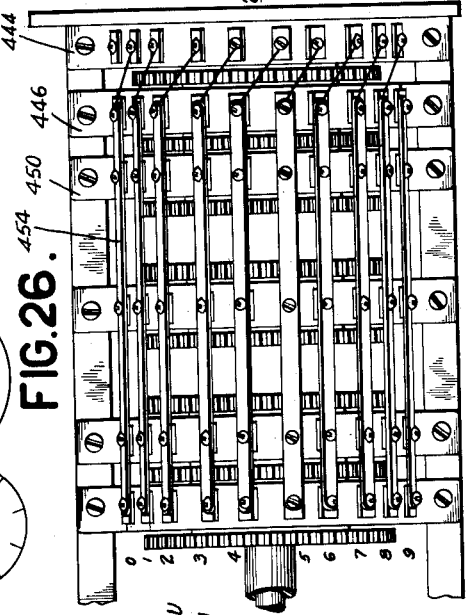
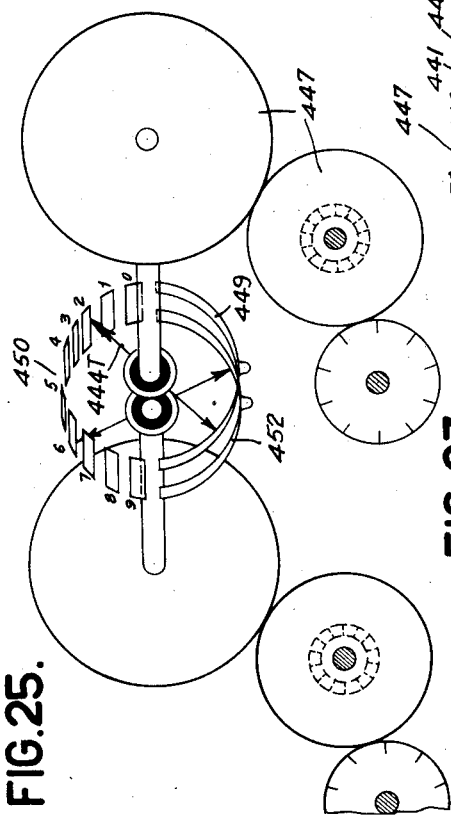
INVENTOR
James W. Bryce
BY
Cooper, Kerr & Dunham
ATTORNEYS

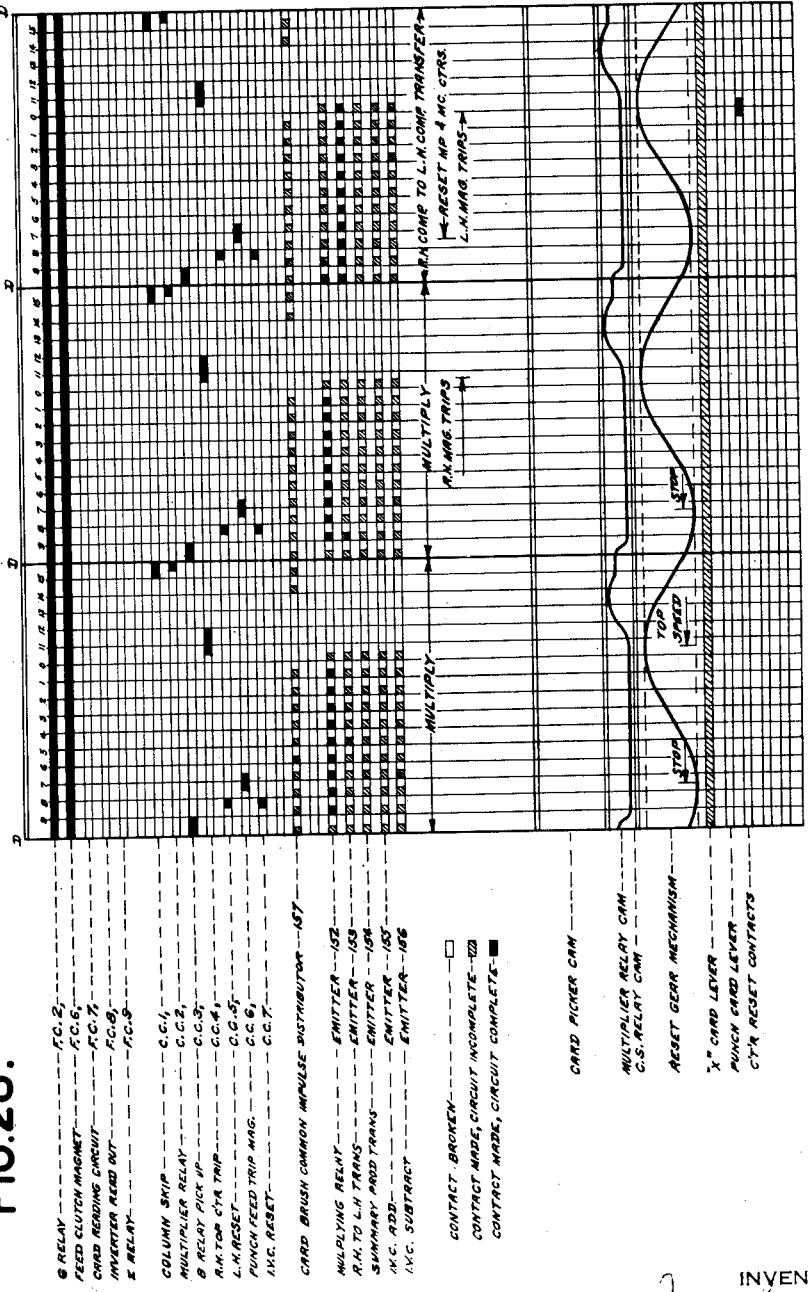

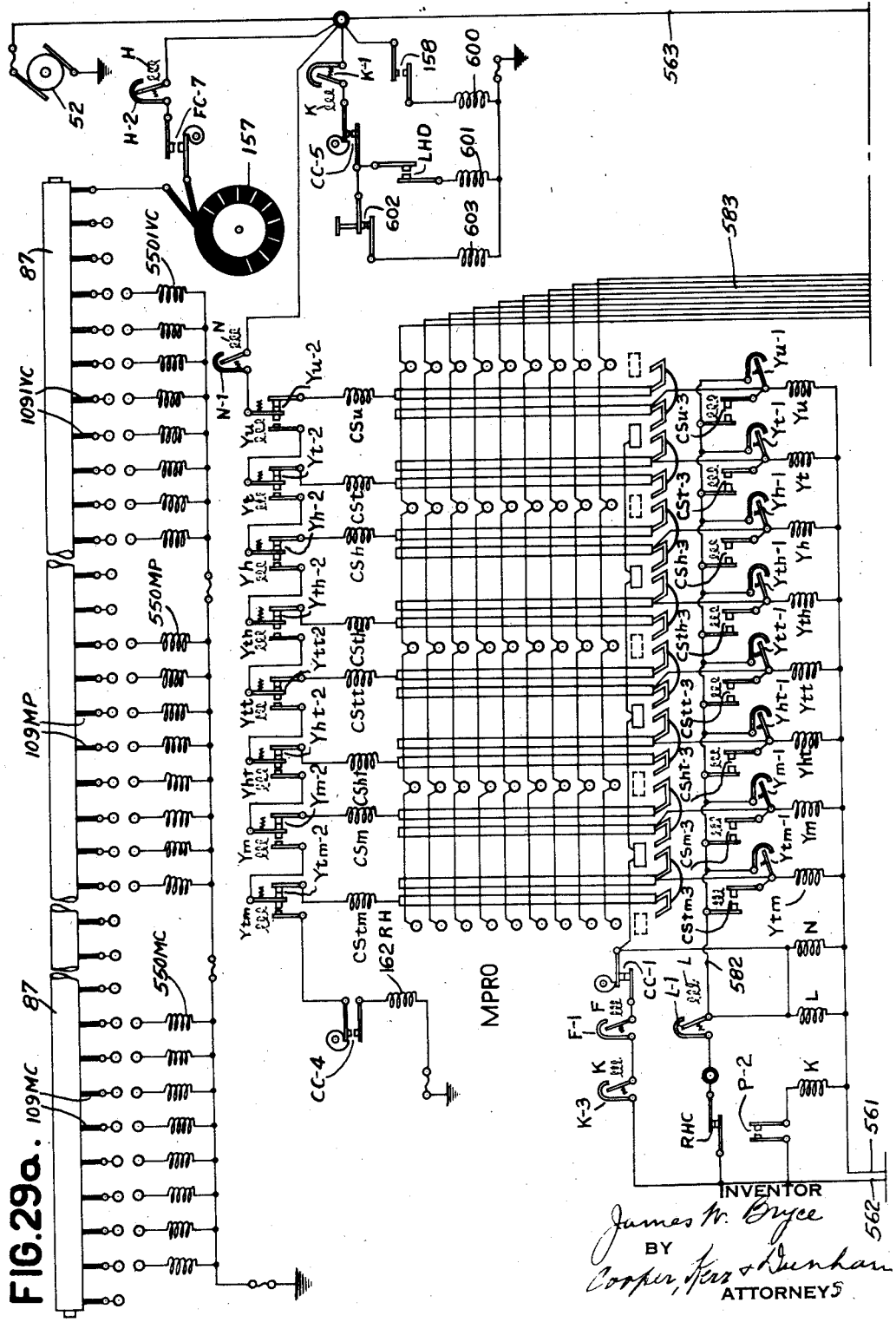

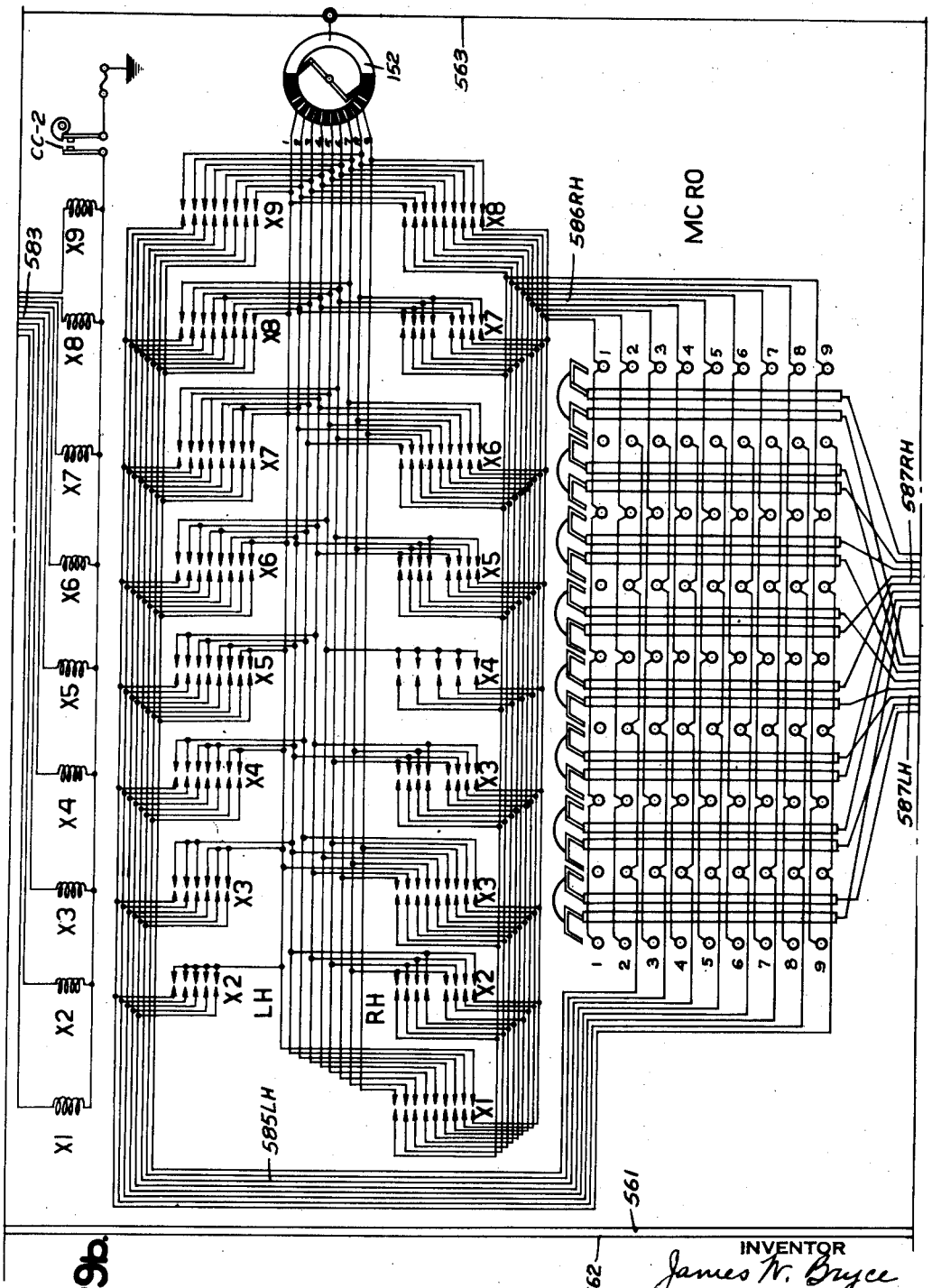

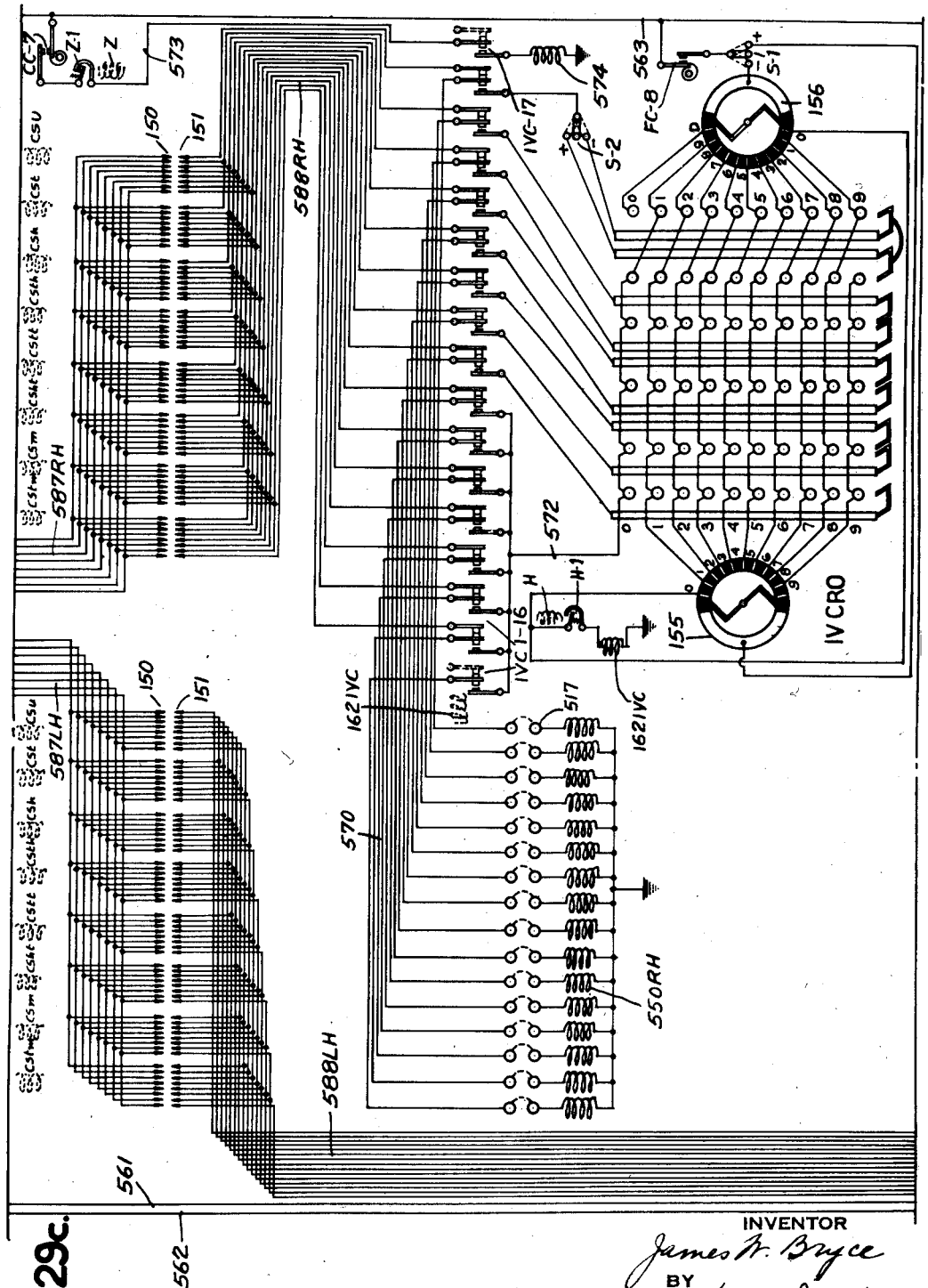

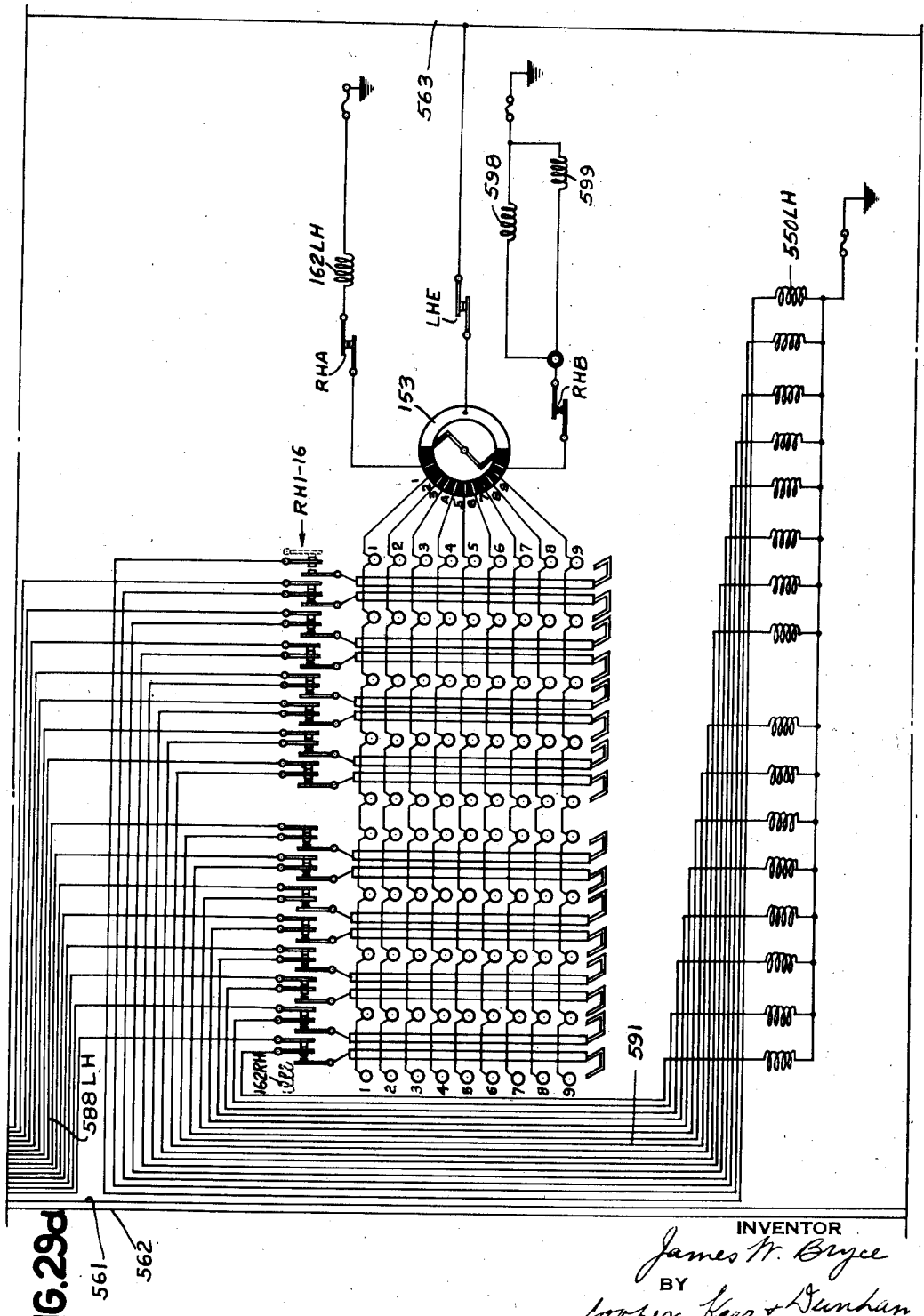

Jan. 25, 1938.  J. W. BRYCE  2,106,476
ACCOUNTING MACHINE
Filed May 7, 1932   17 Sheets-Sheet 17

INVENTOR
James W. Bryce
BY
Cooper, Kerr & Dunham
ATTORNEYS

Patented Jan. 25, 1938

2,106,476

UNITED STATES PATENT OFFICE 2,106,476

ACCOUNTING MACHINE

James W. Bryce, Bloomfield, N. J., assignor, by mesne assignments, to International Business Machines Corporation, New York, N. Y., a corporation of New York Application May 7, 1932, Serial No. 609,883

18 Claims. (Cl. 235—61.6)

This invention relates to improvements in accounting machines and more particularly to improvements in multiplying machines.

In certain classes of work it is desirable that multiplication problems be performed wherein two factors are multiplied and wherein another amount is to be added to or subtracted from the product of the two factors which are obtained by the machine.

Accordingly, the present invention has for one of its objects the provision of a machine which will multiply two factors together and which will also take into the machine another factor or component amount and which machine will effect the multiplication of two of the factors and then either add or subtract from the product thus obtained, the third factor or component result.

A further object of the present invention resides in the provision of a machine wherein multiplication of two factors may be performed automatically by the operation of the machine and wherein by another automatic operation a component amount can be either added to or subtracted from the product previously obtained by the automatic operation of the machine.

A further object of the present invention resides in the provision of a record controlled accounting machine of a type adaptable for carrying out the aforementioned kinds of calculations.

A further object of the present invention resides in the provision of a calculating machine adapted to automatically perform calculations which expressed algebraically are as follows:

$$(A \times B) - C = \text{Result}$$
$$(A \times B) + C = \text{Result}$$

A further object of the present invention resides in the provision of a record controlled accounting machine adapted for automatically performing the foregoing algebraically expressed types of calculations wherein factors A, B and C are automatically derived by the machine from records.

A further object of the present invention resides in the provision of a record controlled and record accounting machine, which machine will automatically by the operation of the machine itself, derive the factors such as A, B and C from records and in which the machine is adapted to automatically record the result which is secured by the machine back upon the record from which the factors entering into the computations were derived.

Further and other objects of the present invention will be hereinafter set forth in the accompanying specification and claims and shown in the drawings, which show by way of illustration what I now consider to be one and a preferred embodiment of a machine incorporating the features of the present invention.

In the drawings:

Figures 1 and 1a taken together show a diagrammatic view of the various units of the machine and also show the train of the driving mechanism of the machine;

Fig. 2 is a vertical sectional view taken through the card handling and reading section of the machine;

Figs. 3 and 3a, taken together, show somewhat a diagrammatic view of the punching section of the machine;

Fig. 4 is a sectional detail of certain parts of the punching mechanism; and Fig. 5 is another detail;

Fig. 6 is a side elevational view of one of the electromagnetic multi-contact relay devices which are used in the machine, which relay devices are used both for column shift and multiplying selection purposes;

Fig. 7 is a sectional view taken substantially on line 7—7 of Fig. 6. This view shows the parts in the armature restoring and knocking off position;

Figs. 8, 9, 10 and 11 show positional views of various parts of the multi-contact relay devices and show the relation of the contacts, the armature latch, etc. in various displaced positions;

Fig. 12 is a side elevational view of the operating cam and driving devices for effecting shifting of parts of the multi-contact relay devices. The view is substantially a section taken on line 12—12 of Fig. 6;

Fig. 13 shows an isometric view of certain electro-mechanical contacts or relay contacts in the RH accumulator;

Fig. 14 shows similar contacts in the LH accumulator;

Fig. 15 shows similar contacts in the IVC accumulator;

Fig. 16 shows somewhat diagrammatically the arrangement of the MP readout device and the driving train to the clutches;

Fig. 17 is a top plan view of the MP readout device completely wired;

Fig. 18 is a detail sectional view, the section being taken substantially on line 18—18 of Fig. 17;

Fig. 19 is a view similar to Fig. 16 showing the

Figure 28A:
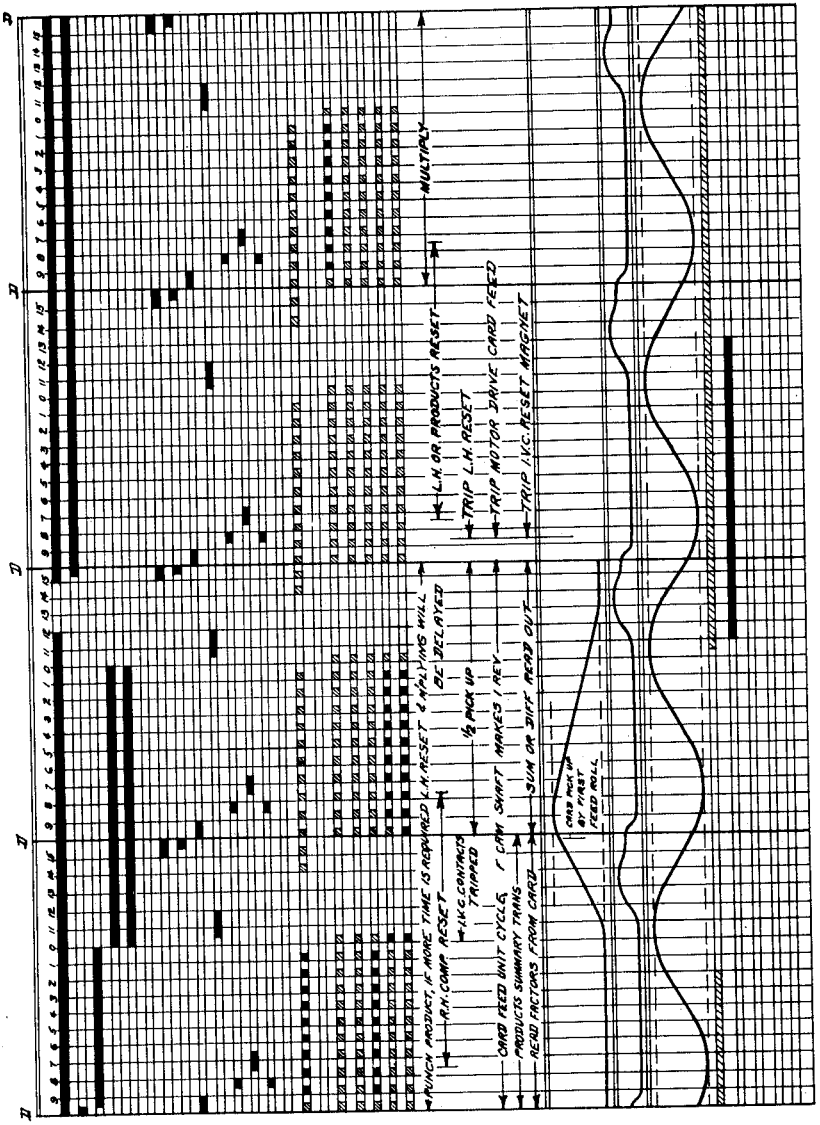

MC readout device and the LH readout device:

Fig. 20 is a top plan wired view of these readout devices; and Fig. 21 is a sectional view taken on line 21—21 of Fig. 20;

Fig. 22 is a diagrammatic view of the RH readout device;

Fig. 23 is a top plan view of this readout device; and Fig. 24 is a sectional fragmentary view taken on line 24—24 of Fig. 23;

Fig. 25 is a diagrammatic view of the inverter counter readout device and the wiring therefor;

Fig. 26 is a top plan view of the same; and Fig. 27 is a sectional view taken on line 27—27 of Fig. 26;

Figs. 28 and 28a taken together, show the timing diagram of the machine; and

Figs. 29a, 29b, 29c, 29d and 29e taken together, and arranged vertically in the order named, show the complete circuit diagram of the machine.

Before describing the detailed arrangement of the parts of the machine, a general description will be given of the various units and their location in the machine. The machine embodies a card feed and card handling section. which is shown in the upper right hand corner in Fig. 1a, and also shown in cross-section in Fig. 2. This part of the machine is arranged to feed cards and derive readings therefrom and afterwards pass the cards into a punching section of the machine which is a punch of the successive column punching type. In the present application only a fragment of this punching structure is shown as its details form no part of the present invention.

The counters and receiving devices of the machine are as follows. In the upper part of the machine there are shown an RH accumulator generally designated RH on Fig. 1a and an LH accumulator generally designated LH on Fig. 1. Also shown in the upper part of the machine there is a summary products accumulator designated SP. In the lower part of the machine there are two counters which are used as multiplier and multiplicand entry receiving devices. Such counters or receiving devices are respectively designated MP and MC on Fig. 1. In the lower part of the machine there is also an IVC counter generally designated IVC on Fig. 1.

The machine also includes a multiplying panel relay unit which is in the lower part of the machine, the same being generally designated MPR. In the lower part of the machine there is also provided a column shift unit generally designated CS. In the present embodiment the column shift unit is of the multi-point mechanically controlled relay type. The machine also includes a number of emitter mechanisms and cam contact devices.

*Machine drive*

The machine is adapted to be driven by a constantly running motor M (Fig. 1a). This motor through a belt and pulley drive and ratchet drive 49, drives a shaft 51 (Fig. 1), which shaft drives an A. C. D. C. generator 52. The A. C. end of this generator is adapted to produce the impulses for actuating the various counter magnets and certain of the relay magnets in the machine and this generator 52 has a D. C. (direct current) take-off section. In short, the generator 52 is provided with both slip rings for taking off the A. C. impulses and commutators and brushes for taking off direct current.

Shaft 51 also through the worm gear drive 53 drives a vertical shaft 54 which shaft drives the units in the upper section of the machine and the units in the lower section of the machine. The drive to the units in the upper section will be first described.

Shaft 54 at its upper end through worm gearing 55 is adapted to drive the counter drive shaft 56 of the machine. The various counters are driven from this counter drive shaft in the customary manner. The drive for reset of the counter units is effected in the following manner. Shaft 56 is provided with a spur gear 57 driving a gear 58 with a four to one drive ratio. Gear 58 has extending from it four Geneva pins 59 cooperating with the other or cross element of the Geneva designated 60. Secured to element 60 is an internal gear 61 which gear has cooperating with it a spur gear 62 mounted on the end of the reset shaft 63. The Geneva cross element 60 also has a shaft 64 which extends to another internal gear 61a similar to gear 61 and having cooperating with it a spur gear 62a similar to gear 62 which drives the reset shaft 63a for the RH accumulator unit in the upper right hand part of the machine (see Fig. 1a). The drive for the lower units of the machine is substantially the same as previously described, that is the shaft 54 through the worm gearing 55b drives the lower counter drive shaft 56b. A similar Geneva drive 57b, 58b, 59b and 60b is adapted to drive an internal gear 61b which in turn drives a pinion 62b mounted on the end of the lower reset shaft 63b. The lower reset shaft 63b resets the MP and MC receiving devices and IVC counter in the customary manner. The lower drive shaft 56b also extends to the right and drives an operating cam 65, which cam is adapted through a follower 66 to actuate a cross sleeve 67 and operate certain shifting mechanism for the multiplier panel relay unit contact panel assemblages. A similar cam 65b is also provided driven from shaft 56b, which cam through a follower 66b is adapted to actuate a cross sleeve 67a and operate the shifting mechanism for the column shift relay units of the machine.

*Card feed and card handling unit drive*

Referring to Fig. 1a the shaft 56 at its extreme right hand end is provided with a gear 68 which through an idler gear 69 drives a gear 70, which through its shaft drives gear 71, which gear 71 in turn drives a gear 72. Gear 72 in turn drives a gear 73, revolvably mounted on shaft 75. Gear 73 has fixed to it one element 76 of a one revolution clutch, the complemental part of which comprises a pawl 77 carried by an arm 78 which is fixed to shaft 75. The one revolution clutch is the customary type used in tabulating machines and this one revolution clutch is engaged by the energization of the usual clutch magnet. With the one revolution clutch engaged, it will be understood that the shaft 75 will rotate in unison with gear 73 and with the one revolution clutch disengaged 73 will continue its rotation and shaft 75 will remain stationary. Gear 73 also drives an intermediate gear 79 which in turn is fixed to a gear 80, which gear 80 drives a train of gears 81, which in turn drive the card feed rolls 82 of the machine. The feed rolls 82 are constantly rotating feed rolls, the same rotating at all times when gear 73 is rotating and at all times when the main counter drive shaft 56 is rotating. Also in train with gear 79 is a gear 83 which gear constantly drives a drag roll shaft 84 having fixed thereto a pair of drag rolls 85.

It will be understood from the foregoing that the card feed rolls 82 and the drag rolls 85 constantly rotate at all times during the operation of the machine when the driving motor is in operation.

The drive of the parts from the intermittent element of the one revolution clutch will now be described.

The shaft 75 has secured to it a gear 86 and also secured to the shaft 75 is a card transfer and contact cylinder 87. As shown, the one revolution clutch element 76 is provided with two notches and the arrangement of this clutch is such that whenever the pawl 77 is engaged, the element 78 of the one revolution clutch will make one complete rotation. The one revolution clutch pawl 77 may be engaged in either of the two notches of the clutch element 76 which relation of the clutch members is provided because one counter cycle is required to traverse the card and carry it past the sensing brushes and another counter cycle is required to deliver the card to the punching section of the machine and since it is desired that the clutch be engageable without delay upon the counter drive shaft turning through either an odd or even number of revolutions.

Drive to intermittently actuated contacts

Gear 86 previously mentioned as being fixed to the shaft 75 drives a gear 90, which gear in turn drives an idler gear 91, driving a gear 92 fixed to cam contact drive shaft 93. Shaft 93 has secured upon it a number of cams for actuating contact devices which are generally known as the FC group of cam contacts of the machine. The arrangement of these cams is such that they make one revolution per card feed cycle in contradistinction to a counter cycle. Fixed to the shaft of gear 90 are card feed rolls 94, which rolls are spring pressed into contact with the card transfer and card contact cylinder 87. Similar spring pressed card feed rolls 95 also cooperate with the transfer contact cylinder 87 and these rolls are driven by a gear 96 in train with gear 86.

It may be here mentioned that the feed rolls 94 and 95 are preferably made of insulating material inasmuch as they at times contact with the transferring contact cylinder 87 which receives current.

Card picker drive

Shaft 75 on one end has secured to it a box cam 97, which box cam has a follower 98 cooperating therewith. The cam follower connects to a rock shaft 102, which rock shaft carries gear sectors 103. Gear sectors 103 are in engagement with the picker blocks 104 (see Fig. 2). By the engagement of the one revolution clutch the picker is called into action and the advance of the picker withdraws a single card from the magazine 105 (Fig. 2) and advances this card into the bite of the rolls 82. The rolls 82 in turn forward the card to the card transfer roll 87. A curved card guide is provided around the transfer cylinder and the advancing card is carried around by the forward rotation of the transfer cylinder and by the rotation of rolls 94 so as to be traversed under the main card sensing brushes generally designated 109 in Fig. 2. Also in cooperation with the card is a pivoted card lever 111, which lever 111 has a tail portion arranged to bear against the upper surface of the card. With the card in position under this tail of the card lever, contacts 112 will be closed.

After the card has been sensed by the main sensing brushes 109, it is advanced by the cooperation of feed rolls 95 with the transfer cylinder 87 between guiding members 114 and 115. While between these guiding members the card is advanced by the cooperation therewith of the drag rolls 85, such rolls extending downwardly into recesses of the lower members 114 in the manner shown in Fig. 1a. This arrangement of drag rolls and recesses provides for a gripping of the card and an advance of the card after it has been released by the rolls 95 so that the card may be delivered into the tray of the punching section of the machine. The drag rolls 85 (Fig. 2) deliver the card under a guide member 117 (Fig. 2) and after the card has been freed from the drag rolls the card is flipped down into the tray of the punching section of the machine. The location of the tray is generally indicated at 118 in Fig. 2 and the position of the card in this tray is indicated at R in Fig. 1a. A card lever 119 (Fig. 2) is also provided adjacent the tray portion 118 and this card lever is arranged to close card lever contacts 120 when a card is lodged in the tray of the punching section of the machine.

The foregoing description has described the manner in which a card is withdrawn from the supply magazine 105 and the manner in which the card is carried past the main sensing brushes 109 and the manner in which the card is delivered into the punching section of the machine. With the traverse of the card past the sensing brushes the amount of the multiplier and multiplicand and extra amount will have been read from the card and entered into the MP receiving device and into the MC receiving device and into the IVC receiving device.

The MP receiving device, the MC receiving device and the LH and RH accumulators, the IVC counter and the SP counter are of the usual type as customarily used in tabulating machines and are provided for electromagnetically actuated clutches. The various accumulators and receiving devices have commutator type readout devices which will be hereinafter more fully described.

Multiplying panel and column shift relays

The multi-contact relays which are used in this machine for controlling multiplication and effecting column shift are those of the types customarily used in electric multiplying machines of this general type. The multiplying relays are more fully described in the copending application of George F. Daly and James M. Cunningham, Serial No. 576,184, filed November 19, 1931. The multiplying relays are substantially similar to the column shift relays and a description of one relay will suffice for both as the action is identical. These multi-contact relays which are used for column shift and multiplier control purposes will now be described.

Suitable frame plates in the frame of the machine (see Fig. 6) are slotted to receive a number of vertical plates 130. Carried on each plate is a magnet which will be designated CS when the relay is used for column shift purposes and X—1, X—2, X—3, etc. when the relay is to be used for multiplier selection purposes. These magnets CS or X when energized, serve to control the relays of the multi-contacts. Preferably the magnets CS or X are used as trip magnets only and the armatures of these magnets are not required to actually shift their related contacts. Furthermore provision is made for relieving the strain from the armature latches at the time of release of the armature latches.

It has been previously explained that cams 65 and 65b (Fig. 1a) are provided on shaft 56b and such cams cooperate with followers 66 and 66b. Followers 66 and 66b each have secured thereto an arm 131 which has a forked end cooperating with a stud on a serrated operating bar 132. The serrated operating bar (see Fig. 12) is slidably mounted and disposed below and at one side of the base of the controlling relay section of the machine and into the serrations of this bar extend arms 133 of a contact operating bail structure. Each arm 133 is fixed to the end of a rock shaft 134 which is suitably journaled in brackets carried by the plate 130. Fixed to shaft 134 at its opposite ends are upstanding arms 135 and 136. Arm 135 is also fixed to arm 133 and spanning 135 and 136 and fixed thereto is a cross member 137 which on its upper surface carries a strip or bail of insulating material 138 (see Figs. 7 and 8). Arm 136 extends upwardly beyond 137 and this upward extending portion of 136 will be designated 136a. Arm 136a is utilized for knocking off the armatures and it also controls certain of the latching operations as will now be described. The magnet generally designated CS or X is provided with a pivotally mounted armature 139 which is spring retracted away from the magnet by spring 140. The armature 139 also is provided with an upstanding portion 141 (see Fig. 7) which portion is in alignment with a screw 142 carried by bent over portion 143 of arm 136a.

By referring to Fig. 7 it will be noted that if the serrated operating bar 132 is in the position shown, that arm 133 will be rocked in a clockwise direction swinging arm 136a clockwise causing the screw 142 to abut against 141 and restore and knock off any previously attracted armature. Each armature 139 is provided with a latch portion 144 and pivotally supported upon member 136a upon a stud 145 is a forked member 146. As shown in Fig. 6 the forked member 146 is disposed to the left of the arm 136a and the forks of this member 146 are turned over and pass the sides of 136a. One of these forked portions is designated 147 on Fig. 6 and this forked portion extends over and cooperates with the latch point 144 on armature 139. The other fork 148 is disposed upon the opposite side of member 136a (see Fig. 7). A spring 149 is provided which is fastened at one end to the right hand fork 148 of the forked member 146, which spring is also fastened to the arm 136a. The action of spring 149 is such that it tends to rock the forked member 146 anticlockwise with respect to 136a. After the armature has been restored and knocked off in the manner indicated in Fig. 7, the serrated operating bar 132 by its cam action is shifted slightly to the right (note the arrows at the bottom of Fig. 8). Shifting of the serrated operating bar 132 to the right allows arms 133 to follow the serrated operating bar. Such following action is brought about by the spring pressure of the set of contact blades 150. This slight movement of 133 to the right swings 136a slightly to the left to a position in which there is still clearance between part 147 and member 136a (see Fig. 8). With the parts in this positon the spring strain of contacts 150 is removed from the latch point 144. The latch may now be released by attracting the armature by energizing the magnet CS or X. Upon energization of such magnet the action of spring 149 causes the forked arm 147 to snap over the top of the latch point 144, the parts now taking the position shown in Fig. 9. The next action is the actual closing of contacts 150 with 151. This is the position of parts shown in Fig. 10. With this condition of parts the cam 65 or 65b has turned to a further extent permitting a further shifting of the serrated operating bar 132. The arm 133 then swings to its extreme anti-clockwise position under the action of spring contacts 150. The insulating bail 138 moves to the left and allows contacts 150 and 151 to close.

The further operation comprises the knocking off the armature as shown in Fig. 7 by the movement of the serrated bar 132 to the left. The movement of this bar positively opens up contacts 150 and 151 against the tension of the blades 150.

Fig. 11 shows the relation of parts upon an operation when no trip of an armature has been effected magnetically. In this case the latching nose 144 cooperates with the forked arm 147 and prevents 136a swinging to the left beyond the latching point. It will be noted that 136a in this figure is in contact with the right hand side of 147. With this position of the parts the contacts 150 and 151 will be kept open.

Summarizing the above multi-contact arrangement provides the following desirable features.

Contact pressure is removed from the latch point prior to the releasing of the latch magnetically. The multiple contacts are opened by a positive mechanical action of the serrated operating bar. The armatures are positively knocked off by a positive cam operation of the serrated operating bar. The timing of contact closure under the Fig. 7 condition can be definitely controlled by the timing of the cam 65 or 65b.

Summarizing the construction provides accurate timing of contact operation with very slight load on the latch points at the time of armature actuation under energization of the control magnets CS or X.

It will be understood that in the present machine there are a number of these multi-contact relays. In the present embodiment eight of such assemblages are employed for column shifting purposes and nine of the assemblages are employed for multiplier plate relay purposes.

The machine also includes a number of emitters of conventional construction, an impulse distributor and a number of CC cam contact devices. The emitters are shown in Fig. 1 at 152, 153, 154, 155 and 156 and such emitters are driven from the main counter drive shaft 56 in the conventional manner. Also shown on Fig. 1 are a number of cams for operating the CC group of cam contacts. These will be designated CC—1 to CC—7 inclusive corresponding to the showing on the circuit diagram. Adjacent the CC cams and driven concurrently therewith is an impulse distributor or timer 157. Certain contacts are associated with the MC receiving device and are arranged to be shifted whenever the MC receiving device is reset. Such contacts are designated 158 on Fig. 1 and such contacts are operated by a member 159 which cooperates with the cam 160 fixed to the reset drive gear of the MC receiving device.

*Electro-mechanical relays in the RH and LH accumulators*

Fig. 13 shows relay devices in the RH accumulator. These relay devices comprise sixteen three-bladed contacts designated RH 1 to 16 inclusive and two-blade contacts RHA, RHB, RHC, RHD, RHE and RHF. Of these latter contacts RHA, RHB, RHD and RHE are normally open contacts and RHC and RHF are normally closed contacts. The contacts are released to shift to reverse position by energization of magnet 162RH, which when energized trips armature 170, releasing 171 and allowing bail shaft 172 to rock under the influence of spring 173. The bail 174 upon moving allows the contacts to shift.

Restoration of the contacts and relatching of 171 with 170 is effected by a train of levers extending to a cam on the reset gear of the RH accumulator. These levers comprise a lever 175 fixed to the bail shaft which cooperates with a lever 176 having its opposite end cooperating with a cam 177 upon the reset gear 178 of the RH accumulator.

The LH accumulator is provided with contacts which are similarly operated. The contacts proper are shown in Fig. 14 and comprise normally open two-blade contacts LHA, LHB, LHC and LHD and normally closed two-blade contacts LHE and LHF. Such contacts are released by a magnet 162LH similar to 162RH, which upon the circuit diagram will be designated 162LH. The restoring parts are the same construction as for the RH contacts and are operated from a cam similar to 177 fixed to LH reset gear 178LH.

Other contacts similar to those previously described are disposed in the IVC counter or accumulator. These contact devices comprise seventeen three-bladed contacts designated IVC 1 to 17 inclusive, and such contacts are tripped by the energization of a control magnet 162IVC. The contacts are restored in a similar manner, that is by a cam provided on the reset gear of the IVC accumulator.

*Punching mechanism*

In general the punching mechanism is of the successive column acting repetition punching type.

The punching mechanism generally is of the form shown in the Lee and Phillips United States Patent No. 1,772,186 and also of the form shown in the copending application of Lee and Daly, Serial No. 391,874, filed September 11, 1929 (British Patent No. 362,529). Certain features of the punch are also shown and more fully described in the copending application of George F. Daly, Serial No. 461,993, filed June 18, 1930 Patent No. 1,950,485. Other features of the punch are shown in patents to Schaaff, No. 1,803,979, dated May 5, 1931 and No. 1,821,078, dated September 1, 1931.

In general it may be stated that the punching mechanism is adapted to receive a record card in the receiving tray 118 (Fig. 2), R on Fig. 3a designates a record card in this position.

The punching machine includes two card feed racks 251 and 252. 252 has suitable pusher fingers 263 attached to an arm carried by the rack 252. The punching device is driven by a separate motor M—2. This motor, through the gear train shown, drives a shaft 255 which has a ratchet shaped clutch element 262 fixed on one end of it. Alongside of 262 is a gear 255a which meshes with the lower teeth of 251. Secured to gear 255a is a disk 264. Pivoted on this disk 264 is a member 266 provided with a ratchet shaped clutch tooth 267. Alongside of member 266 is another member 266b which lacks the clutch tooth. On 266 is a pin 266c overlying an arcuate surface of 266b. The free end of 266b is con-nected to a toggle member 268 by a link 269. 268 is pivoted on disk 264 at 270. The opposite end of 268 remote from its pivot 270 is connected to a spring element 271. Spring 271 tends to hold the clutch tooth 267 out of engagement with the clutch teeth of element 262 and allows it to engage when 268 is shifted.

For the purpose of effecting a clutching action punch clutch feed magnet 275 (Fig. 5) is provided. This magnet when energized attracts its armature, causing an arm 277 to engage a pin 278 (see Fig. 3a, in this figure the pin engaging extension of this arm 277 is shown broken off for clarity of illustration of the other parts), depressing 266b and allowing 266 to descend so that the tooth 267 engages with the ratchet 262. Upon such engagement the gear 255a will be driven in a counterclockwise direction substantially a single revolution, shifting rack 251 to the left. This action, through the card pusher shown in Fig. 3a, moves the card from the R position to the R—1 position. It may be also mentioned that when magnet 275 is energized, an arm 277b on the armature of the magnet will close contacts 215. Such contacts upon closure are latched closed by a latch 216. 216 is tripped to allow the contacts to reopen by a knock-off 217 carried on the back of gear 255a (see Fig. 3a).

At the termination of the counterclockwise movement of gear 255a, the tails 279 of parts 266 and 266b, will strike a projection 280 on a fixed plate to effect the disengagement of the tooth 267 from the ratchet wheel 262. It will be understood that the tails 279 do not actually pass the fixed projection 280 but are merely intercepted by such projection and later retreat away from the projection in a clockwise direction. This action also restores the toggle parts to normal position.

The above driving action has wound up a spring in barrel 283. Upon disengagement of the one revolution clutch 267 previously referred to, rack 251 returns to the right under the influence of the spring power of the spring in barrel 283.

The driving train to the second card carriage rack 252 will now be described. Rack 251 has its upper teeth intermeshed with gear 284. Gear 284 has secured to it a member 285 (see also Fig. 4) having a single notch or tooth disposed in the plane of a pawl 286 which is pivoted on a part 287 fixed to the shaft 288. Shaft 288 on its opposite end has a gear 289 which meshes with card carriage rack 252. Suitable mechanism shown in Fig. 4 controls the co-action of the pawl 286 with member 285 so that with the rack 251 in extreme right hand position pawl 286 will be disengaged from the clutch element 285. Such disengagement is effected by the rocking of 290 in a clockwise direction by the co-action of the pin 293 with a block 292 carried on rack 251. Upon initial movement of 251 to the left the block 292 will clear the pivoted camming element 290 allowing a slight counterclockwise motion of it so that 286 under spring action may rock and engage the tooth of member 285. Thereafter drive will come from 251, through gear 284, through 285, to pawl 286 to 287, to shaft 288, so that a clockwise rotational movement will be imparted to 288. This action will, through gear 289, traverse rack 252 to the right. The card carriage rack 252 will thus be shifted to extreme right hand position permitting the card pushers 263 (Fig. 3) to first ride over the surface of the card under the pushers and ultimately engage back at the trailing edge of the card at the R—1 position. Rack 252 has associated therewith a spring driving device comprising the usual spring barrel generally designated 294. This spring device is wound up by the traverse of 252 to the right and causes a movement of 252 to the left under spring action. The rack 252 also has associated with it an escapement mechanism 295 having a dog 295a. This escapement is more fully described in Schaaff Patent No. 1,426,223, dated August 15, 1922 and in the Lee and Phillips Patent No. 1,772,186. Removably secured to the card carriage rack 252 is a skip bar 296 provided with a notched portion 297 which permits skip lifter lever 298 to descend when in the notch or to remain elevated when riding on the high part of the bar. When the skip lifter lever descends into the notch it allows the dog 295a of the escapement mechanism to cooperate with the ratchet teeth of rack 252. With the skip lifter lever 298 riding on the top of the skip bar 296, the escapement will be disabled so that the card carriage rack 252 can traverse without stopping at each card column until the notch 297 is reached. Thereafter there is an intermittent motion of the card carriage to the left under spring action under escapement control. When the skip lifter lever again rides out at the notch the card carriage rack 252 takes its full excursion to the left. The location of the beginning of notch in the skip lifter bar determines the position for the beginning of result punching. When the escapement dog is lifted up certain contacts are opened as is customary in machines of this class. These contacts are designated 299.

The punching mechanism proper need not be fully described as it is fully set forth in the Lee and Phillips patent above referred to and in British Patent No. 362,529, which corresponds to the Lee and Daly United States application, Serial No. 391,874. In brief, the punching mechanism comprises a number of punches 300, which punches are adapted to be depressed to actuate the card through interposers not shown under the control of the punch selector magnets. The details of the punching mechanism are also fully set forth in the copending application of George F. Daly and James M. Cunningham, Serial No. 576,184, filed November 19, 1931.

Referring to Fig. 3, disposed alongside the card carriage rack 252 and fixed to the frame of the machine is a block or strip of insulating material designated 311. Disposed in this block of insulating material are a number of spots 312 of conducting material and alongside these spots is a common strip of conducting material 313. A suitable bridging piece or multiple brush assembly 314 is carried by the card carriage rack 252 and as the card carriage rack moves the bridging brush 314 is displaced and establishes circuit connections from the common bar 313 to one of the spots 312 depending upon the columnar position of the card carriage rack 252. For accuracy of spacing, the conducting spots 312 are placed in two rows, the spots of the lower row being interstaggered with the spots on the upper row as shown in Fig. 3.

Card ejector

Referring to Fig. 3, after the card has reached the R—1 position and has been traversed past the punches 300 and has been punched, it ultimately reaches a position at the extreme left hand end of the punching section of the machine from which point it must be discharged into a discharge hopper. The card eject mechanism is shown in Fig. 3 with the parts shown in the position which they assumed before the machine was started in operation. Upon the first card feeding operation through the punching section of the machine, rack 251 will have moved towards its extreme left position. After reaching the dotted line position shown in Fig. 3, 251 moves further to the left and thrusts a rack 330 to the left compressing coil spring 331. Bearing against a shoulder on rack 330 is a contact operating part 332. When 330 is thrust to the left, contacts P—3 which were previously closed will open under their own spring action. The displacement of rack 330 to the extreme left position will, through intermediate gears 335, rock a shaft 336 in a clockwise direction to bring in ejector clip assemblage 337 away from the position shown in Fig. 3 to a position in which the ejector clip can receive a card which has been advanced through the punching section of the machine. With the ejector clip assemblage 337 disposed in such card receiving position the assemblage will be latched in such position by a latch not herein shown, but which latch is fully described in British Patent No. 362,529 (see latch 216 of that patent, Fig. 16). The ejector clip latch is adapted to be released by an ejector clip magnet not shown in Figs. 3 and 3a, but shown in the aforementioned British Patent No. 362,529 and in the circuit diagram Fig. 29e. The action of the ejector assemblage may be briefly stated to be as follows. Upon energization of the card eject magnet 610, (Fig. 29e), the ejector clip assemblage which has then grasped a card, swings from the card receiving position to the position shown in Fig. 3, in which position the jaws of the ejector are opened up so that the card can be discharged therefrom.

Contact devices in the punching section of the machine

Contact devices P—3 controlled by 330 have been described. Also associated with the ejector end of the punching section of the machine are a pair of contacts P—4 which contacts are closed by their operating bail 333 being displaced anti-clockwise upon movement of 330 to the right and which contacts are allowed to open under their own spring action upon 333 being permitted to rock clockwise upon movement of 330 to the left hand position.

An extension 345 on rack 252 is adapted to shift a pivoted contact actuator 345a to close last column contacts P—2 when rack 252 has passed beyond the last card column position and to allow these contacts P—2 to open when the rack 252 moves to the right to any of its other positions.

Referring to Fig. 3a, 120 are card lever contacts previously described and controlled by card lever 119. Such contacts 120 are closed whenever a card is present in the R position. Also at the right hand end of the punching section of the machine are contacts P—1. These contacts are normally closed with the rack 251 in the position shown and such contacts automatically open up upon movement of 251 to the left from the position shown. They furthermore remain open during the complete traverse of 251 to the left and back to its starting position.

MP readout

Referring to Figs. 16 to 18 inclusive, 410 is a clutch gear pertaining to the units order of the MP receiving device. Gear 411 is driven from this clutch gear and this gear in turn drives two brush assemblages, one designated 412U, which traverses a set of segments 413 and also a current supply segment 414. There is another brush 415U driven by gear 411, which traverses a segment generally designated 416, which segment is provided with a single conducting segment spot at the zero position. Brush 415U also traverses a common supply segment 417. There is a similar brush 415T which is positioned from the tens order clutch wheel 418 and which also traverses the segment 416 which contains only the single conducting spot at the zero position. Brush 415T also traverses a separate common current supply segment 419. Similarly there is a brush 412T driven in unison with brush 415T which traverses the segment spots 420 and which receives current from the common current supply segment 421. This arrangement of brushes and segments is repeated for higher orders in the MP readout device, i. e. each alternative segment 424 is like 416 with only a single spot in the zero position on each segment. Alternating with these segments are other segments similar to 413 and 420 with a multiplicity of spots on each segment.

Referring to Fig. 17, the 1 to 9 segment spots of the 413 and 420 segments and alternating segments of this type, skipping the intermediate segments of the zero spot type, are wired together by transverse bus connections, generally designated 422. Likewise on the other alternate segment such as 416, 424, etc. (which contain only zero spots), the zero spots of such set of segments are wired together by bus connections 425.

MC and LH readout

Referring now to Figs. 19 to 21 inclusive, in Fig. 19 is shown the brush driving arrangement for the MC and LH readouts. In this embodiment the units clutch gear train 426 drives a units brush 427U which cooperates with a set of segments 428 which receive current from a common conductor segment 429. Similarly the units driving train 426 drives a brush 430U receiving current from a conductor segment 431 and cooperating with segments 432. Also cooperating with segments 432 is another brush 430T receiving current from 433 and driven by the tens order train 434. This train 434 also drives a brush assemblage 427T which cooperates with the segments 435 and receives current from the segment 436. The arrangement thus described is repeated for relatively higher orders of the readout devices.

Referring now to Fig. 20, this figure shows the cross-wiring arrangement for the MC and LH readout devices. The 1 to 9 spots of segment 428 are shown connected to the 1 to 9 spots of the 435 set and the 1 to 9 spots of the 432 set are shown connected to the 1 to 9 spots of the 438 spots skipping over the set of spots to the left. These bus connections are respectively indicated by the wires generally designated 439 and 440. On the LH readout the wiring is identical except that these readout devices are provided with ten segment spots instead of 9 as used on the MC readout device.

Inverter counter readout

Referring now to Fig. 25, 441 generally designates the units order clutch train. This train drives a brush 442U cooperating with a common segment 443 and with the segment spots 444. Also driven by train 441 is another brush 444U which cooperates with a common segment 445 and with a set of segment spots 446. On the tens order the clutch train 447 drives a brush 444T which receives current from common segment 449 and cooperates with segments 450. The hundreds train 451 drives a brush 444H which cooperates with the segments 450 and receives current from conducting segment 452.

In the inverter readout it will be seen that the units order is provided with two sets of conducting segments 446 and 444. These segment spots 446 and 444 are wired together as shown by the wiring generally designated 453. The arrangement of this wiring is such that the 9 spot of the 444 segment is wired to the 8 spot of the 446 segment. The 8 spot of 444 segment is wired to the 7 spot of 446 and so on, as clearly shown in Fig. 26. On relatively higher orders of segments other than the two units segments, there is provided a simple transverse bus connection between the correspondingly numbered segment spots as indicated at 454.

On the inverter readout there is certain other special wiring for the introduction of 9s into the RH accumulator. This special wiring will be hereinafter discussed in connection with the circuit diagram.

RH readout

Fig. 22 shows the general arrangement of the readout for the RH accumulator. With this readout mechanism it will be noted that the segment spots 401 are common to two sets of brushes designated 402 and 403 respectively and which brushes cooperate respectively with conducting segments 404 and 405. Brush 402 as shown in Fig. 22 is driven from the units order clutch gear 406. Brush 403 is driven by the tens order clutch gear 407 by the gearing diagrammatically illustrated. A similar arrangement of brushes and readout spots is provided for the relatively higher orders of the RH and LH accumulator readouts. The various segments of the readout mechanism are transversely connected by transverse buses generally designated 408 in Fig. 23.

General operation

Before describing the circuit diagram in detail, a general description of the operation of the machine will be given which will be helpful in understanding the subsequent detailed operation accompanying the description of the circuit diagram. Cards are placed in the machine prepunched with three amounts A, B and C. It will be remembered that the problem which the machine is to handle is to derive these three factors or amounts from a card and to multiply two of these factors together and then to add or subtract the other factor which is also derived from the card from the product so obtained. The machine is pre-set for a subtracting operation or an adding operation by the manipulation of certain switches. It will be assumed that it is intended to subtract an amount from the product obtained by the operation of the machine. The cards are placed in the machine, the machine is set in operation by the start key. The three amounts A, B and C are concurrently read from the card. The multiplicand (A) is entered into the MC receiving device. The multiplier (B) is entered into the MP receiving device and the third amount (C) is entered into the IVC accumulator. The cycle of the machine is so arranged that before the multiplying computation starts, the amount standing in the inverter counter is read out and inverted into complemental form in the event that the machine is set for subtraction. Such true complemental amount is entered into the RH accumulator prior to this accumulator receiving any RH components of the partial products of A×B. The inverted amount which is so entered into the RH accumulator is the true complement of the amount read from the card. The machine then proceeds with its usual multiplying operation entering partial products concurrently into the LH and RH accumulators and subsequently there is a gathering together of the RH accumulation into the LH accumulator. This gathered together amount which ultimately stands on the LH accumulator will be the product of the multiplicand A by the multiplier B less the other amount C which was entered into the IVC counter and derived from the card. The machine then proceeds in the usual way to punch the result of A×B minus C back upon the card from which the factors entering into the computation were derived. The machine also introduces the final amount into the summary products accumulator.

In the event that the machine is set for addition the operation is substantially the same as just described, except that in place of reading out a true complement from the inverter counter the actual amount standing on the inverter counter is read out and entered into the RH accumulator.

Circuit diagram

The prepunched cards are first placed in the machine. The first operation to set the machine into operation is to close the switch 560 (Fig. 29e) providing a source of current supply for the main driving motor M. Rotation of the motor M starts the drive of the A. C.-D. C. generator 52 and supplies direct current to the D. C. buses 561 and 562. Alternating current impulses are likewise impressed upon bus 563 and to ground. Start key 564 is now depressed, which completes a circuit from the 561 side of the D. C. line through the relay coil C, through cam contact FC—2 and back to the 562 side of the D. C. line. With contacts FC—2 closed and upon concurrent operation of the start key, a stick circuit is established through the points C—I of the relay C and through the stop key contacts 565 now closed and back through FC—2 to the other side of the line. The energization of coil C also closes relay points C—2 and a circuit is established traced as follows. From the 561 side of the D. C. line, contacts F—2 now closed, main card feed clutch magnet 566 (see also Fig. 1a), through cam contacts FC—6 now closed, relay points C—2 now closed, contacts LHF now closed, relay points L—2 now closed, through contacts RHF now closed, contacts P—I which are on the punch rack and now closed and back to the other side of the 562 line. It may be explained that contacts P—I are only closed when the feed rack of the punching section of the machine is in the right hand position. This contact interlocking action is provided to prevent starting up of the card feed in the main card handling section of the machine when the rack in the punch section is not returned to proper position. Relay coil F is energized when a card is in the card tray of the punching machine by the closure of card lever contacts 120. The energization of F opens points F—2 and prevents the starting of a feeding action if a card is disposed at the R position in the punching section of the machine at this time. It will be understood that the start key is kept down for a time.

It has been explained before that the feed of the machine is arranged to permit the use of constantly running feed rolls in the machine for all feed rolls except those which are associated with the contact and card transfer roll 87. The arrangement of the feed is such that upon first starting up the machine when cards are first placed in the magazine, it is necessary to press down the start key after which the machine will run through four counter cycles to feed the first card. After the machine has been started and when it is in operation upon a run of cards only two counter cycles are required for card feed in the main card handling section of the machine. The first complete card feed cycle upon starting up the machine will advance the first card over the top of the transfer roll and at the end of the first cycle the 9 index point position will be about ready to pass under brushes 109. At the beginning of the second card feed cycle the card traverses the reading brushes 109 and the multiplier and multiplicand amounts and the extra amount are entered into the MP, MC and IVC receiving devices.

Figure 29:
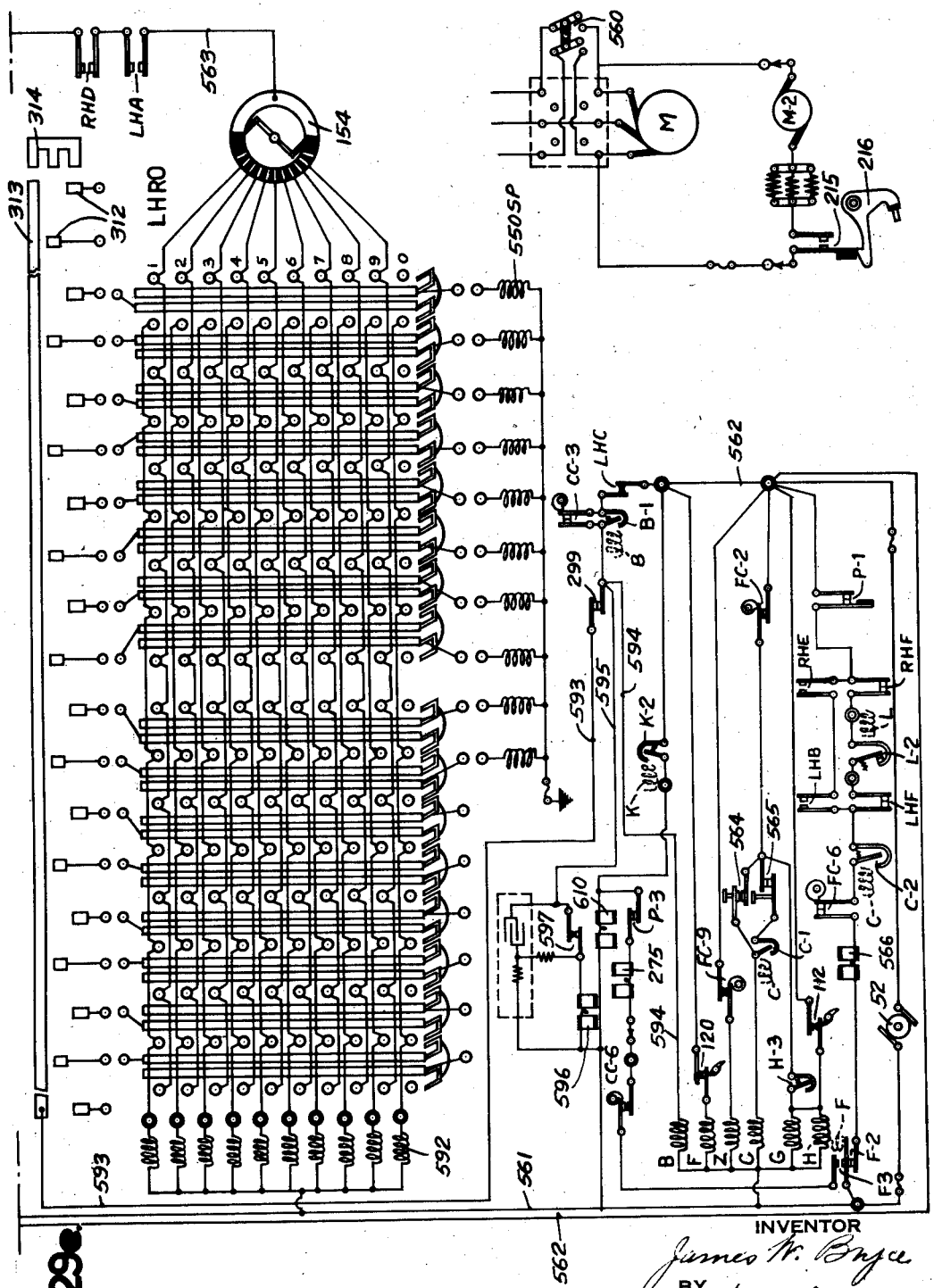

The entry circuits will now be traced. The passage of the card through the card handling section of the machine will close card lever contacts 112, energizing relay coil H (Fig. 29e). Energization of coil H closes points H—2 (Fig. 29a) and current accordingly flows from the 563 side of the A. C. line, through H—2 now closed, through cam contacts FC—7 now closed, through the impulses distributor 157 and at the proper index points in the cycle of the machine to card transfer and conductor roll 87 and through brushes 109 pertaining to the multiplier designated 109MP and brushes 109 pertaining to the multiplicand designated 109MC and brushes 109 pertaining to the extra amount designated 109IVC.

The customary plug board is provided and plug connections extend the brush circuits to the MP entry device, the MC entry device and the IVC entry device. The magnets of these devices are respectively designated 550MP, 550MC and 550IVC. After passing through the counter magnets of the entry devices, impulses flow back to ground.

By the foregoing entry operations, the multiplier amount, the multiplicand amount and the extra amount will be set up in the MP, the MC and the IVC entry receiving devices and the readout devices of these different entry receiving devices will have been correspondingly set.

It will be assumed first that the machine is to be set for adding the extra amount to the product derived by the operation of the machine. For adding, switch S—I (Fig. 29c) will be thrown to the plus position and switch S—2 will be thrown to the plus position.

On the circuit diagram, Fig. 29c, the inverter counter readout which is shown on Figs. 25, 26 and 27 inclusive, will be generally designated IVCRO.

It has been explained how coil H has been energized by the closure of card lever contacts 112. The energization of coil H closes relay points H—I (Fig. 29c). Before any multiplying operation is effected and before the entry of any partial product amounts into either the LH or RH accumulators is effected, the amount standing on the IVC counter is directly read into the RH accumulator. This is effected in the following manner.

At the proper time in the cycle cam contacts FC—8 close and switch S—I being in the plus position, current flows from the 563 side of the A. C. line over to the emitter 155. At the time contacts FC—8 close, one of the emitter brushes is on the zero spot. Current accordingly flows through the zero spot, through relay points H—I now closed, and back to ground through magnet 162IVC. The energization of the 162IVC magnet releases the IVC 1 to 17 contacts which thereupon shift to reverse position from that shown in the diagram. Subsequently, upon the operation of the emitter 155 the emitter emits impulses through the IVCRO readout which impulses flow up through the IVC 1 to 16 contacts and over via transfer lines generally designated 570 and through plug connections at plug board 571 to the RH counter magnets which are designated 550RH and back to ground. In this way the amount standing on the IVC accumulator is added in the RH accumulator.

In the event that the amount C which is entered into the IVC counter is to be subtracted from the ultimate product obtained by multiplying A×B, the switch S—1 is shifted to reverse or minus position and switch S—2 is also shifted to the minus position. One of the brushes of emitter 156 on encountering the zero spot establishes the same circuit as before to the 162IVC magnet causing the shift of the IVC 1 to 17 contacts. The emitter 156 then emits impulses through the IVCRO readout and the result of this emission of impulses through the readout is that the true complement of the amount standing on the IVC counter is entered into the RH accumulator.

The term "true" complement has the following significant meaning. If all orders are complemented to 9, this is a 9's complement, if all orders are complemented to 10, this is a 10's complement, if the lower orders are complemented to 9 and the highest order where a significant figure occurs is complemented to 10, this is a "true" complement.

It will be noted that the RH accumulator includes sixteen counter magnets and accordingly in order that there be a true complementary entry made into this accumulator, provision must be made for filling in extra nines to the left of the highest order entry. This is effected by a branch circuit 572 which leads to the nines spot of emitter 156 and with this circuit which is wired to the eight IVC contacts (IVC 1 to 8), nines are entered into the eight left hand positions of the RH accumulator.

During the time when amounts are being transferred over from the IVC counter to the RH accumulator relay coil Z (Fig. 29e) is maintained energized by the closure of cam contacts FC—9. Energization of relay Z opens contacts Z—1 (Fig. 29c) and opens a circuit 573 which extends down through the three-blade contacts IVC—17 to the IVC reset magnet 574. Upon completion of the transferring over operation from the IVC counter to the RH counter, cam contacts FC—9 open, deenergizing coil Z, allowing contacts Z—1 (Fig. 29c) to reclose, whereupon upon closure of cam contacts CC—7, current flows down through the IVC—17 contacts, which are in shifted position, to the reset magnet 574. Energization of 574 initiates reset of the IVC accumulator in the customary manner and reset of the IVC accumulator restores contacts IVC 1 to 17 to the position shown in the circuit diagram (Fig. 29c).

In the punching section of the machine there is a last column contact P—2 (Fig. 3) which is closed when the card has passed beyond the last column position in the punch. The closure of this contact P—2 causes relay magnet K (Fig. 29a) to become energized. Energization of relay K shifts points K—2 (Fig. 29e) and points K—3 to a reverse position from that shown on the circuit diagram and allows current to flow through a path traced as follows. From the 561 side of the D. C. line, through points F—3 now closed, through CC—6 now closed, through punch rack feed magnet 275 in the punching section of the machine, through contacts P—3 which are closed at this time and operated by the eject mechanism of the punch, through points K—2 and back to the other side of the D. C. line. The energization of 275 causes the closure of contacts 215 (Fig. 29e) and brings the driving motor M—2 of the punching section of the machine into operation. It may be explained that contacts 215 are latched closed by means of a latch device 216 and that such latch device 216 is released at the proper time in the cycle of operation of the punching section of the machine. After the card is sensed by the sensing brushes 109 (Fig. 1) and the amounts have been entered into the receiving devices of the machine, there is an additional counter cycle which ensues before the card reaches the R position in the punch and after the card reaches this R position and moves to the R—1 position, and provided the punch parts are in proper position, the multiplying operation is initiated.

*Column skip and cycle controller*

It has been previously explained that coil F (Fig. 29e) was energized under the control of the card lever contacts 120 in the punch. Energization of F closes relay points F—1 (Fig. 29a) and at the time these relay contacts are closed certain controlling contacts RHC are also closed. On Fig. 29a the MP readout is designated MPRO, the zero spots of this readout device are wired to the relay points F—1 by a wire 581, through cam contacts CC—1. The cycle controller and zero column skipping arrangement herein shown is more fully described in the copending application of James M. Cunningham, Serial No. 606,585, filed April 21, 1932, but in brief it comprises a number of relay points Yu, Yt, Yh, etc., u, t and h designating units, tens and hundreds orders. The relay coils Y have two sets of relay points, one set Yu—1, Yt—1, etc. being stick contacts and the other sets of points being for column selection and column shift control purposes. Such other set is designated Yu—2, Yt—2, etc. The magnets of the CS relays previously referred to are designated CSu, CSt, CSh, etc. These column shift relays in addition to having the column shift control contacts which have been previously designated 150 and 151 have each an additional contact pair which will be given the general designation CSu—3, CSt—3, etc.

If any brush of the readout device stands upon a zero spot, its corresponding Y magnet will be energized, current flowing from the D. C. line 562 through relay points K—3, relay points F—1, cam contacts CC—1, over via wire 581 to the zero spots of the readout, thence via the corresponding brush or brushes standing on a zero spot or spots and then to the respective circuits shown to the respective Y magnets. It will be noted that with relay points K—3 and F—1 closed and with cam contacts CC—1 closed, a circuit will be established to relay coils L and N. Energization of L will establish a stick circuit from line 562 through contacts RHC normally closed, relay points L—1 to relay coil L. Closure of relay points L—1 will also establish a circuit from D. C. line 562, through the RHC contacts and through L—1 to a circuit 582, which extends over and connects with one side of each of the CSu—3 to CStm—3 group of contacts. The other side of these respective contacts are wired back to their corresponding Y magnets and therethrough to the other side of the D. C. line. Accordingly, when any Y magnet becomes energized due to a brush standing on the zero spot in the readout in its corresponding column, the energization of this Y magnet will establish its corresponding Y—1 stick contacts and the Y magnet will remain energized by the current which flows over to it through line 582.

It will be assumed that the multiplier amount is such that there is no zero in the units order, that there is a zero in the tens order and that there is a significant figure in the hundreds order. With this condition, coil Yt will become energized and will be held energized by its stick relay points Yt—1. The energization of Yt will shift contacts Yt—2 to the reverse position from that shown. The stick circuit energization of the Yt magnet will maintain these contacts Yt—2 shifted. Yu—2 will not have been shifted because its corresponding Yu magnet has not been energized. The same will apply to the Yh—2 contacts.

The machine is now ready to multiply by the amount in the units order of the multiplier. Initiation of multiplication is effected in the following manner. Upon the closure of the relay points K—3 and F—1 and cam contacts CC—1 as above described, a coil N is also energized, which coil is in parallel with relay coil L. Energization of this coil N closes its relay points N—1 and current is allowed to flow from the A. C. line 563 through N—1, through the Yu—2 contacts which are in the position shown, down through the CSu magnet and out via the units brush of the MPRO readout which is standing say on the five spot down through the fifth line of the group of wires generally designated 583 to the X—5 multiplying relay control magnet (see Fig. 29b) and back to ground. The time of flow of current to the path just traced is timed according to the closure of cam contacts CC—2 (Fig. 29b).

There will accordingly be a concurrent energization of the CSu magnet and the X—5 multiplier relay control magnet, such magnets being now in a series circuit. Energization of X—5 controls the emission of impulses for the proper multiplying computation from emitter 152 and the energization of CSu directs the entries into the proper columnar orders of the RH and LH accumulators.

It has been previously explained that when the multi-contacts of the CSu relay close, that an extra contact pair CSu—3 is also closed. This closure of the CSu—3 contact pair which takes place as an incident to the flow of current to the multiplying relay control magnet X, causes the energization of the Yu relay, which relay was not previously energized, its related brush not standing upon a zero spot. Energization of Yu then shifts the relay points Yu—1 and Yu—2 so that upon a succeeding multiplication by the next significant figure current flowing in through N—1, will be diverted by the Yu—2 contacts over to the Yt—2 set of contacts which are in reverse position from that shown, thence over to the Yh—2 contacts which are in the position shown, since they have not been shifted by energization of Yh by a brush of the readout in the hundreds order standing on a zero spot. The next multiplying current impulse then flows through N—1, through Yh—2, through CSh, over through the brush of the readout to the particular wire of the 583 group, say the seventh wire and down through the X—7 magnet and out to ground upon closure of cam contacts CC—2 (Fig. 29b). Again there will be a concurrent energization of the X—7 magnet and the CSh column shift magnet and the energization of CSh will direct the proper entry of the impulses into the LH and RH accumulators at a shifted over columnar position therein.

After the multiplying computation is complete, cam contacts CC—4 (Fig. 29a) close. At the time such contacts close, all of the Y—2 set of contacts will have been shifted to reverse position from that shown so that there is a circuit path from the 563 side of the A. C. line, through N—1, through all of the Y—2 set of contacts, through CC—4 now closed, through relay magnet 162RH and back to ground. The manner of controlling the emission of differentially timed product representing impulses need not be traced in detail the manner of which is fully described in British Patent No. 358,105, dated October 5, 1931. It is sufficient to state that the energization of the X magnets of the multiplying relays establishes their related contacts as shown on Fig. 29b and at the proper time in the operation of the machine, current impulses flow out from the emitter 152 through the multiplying relay control contacts and over to the lines generally designated 585LH and 586RH to the LH and RH sections of the multiplicand readout designated MCRO. The multiplicand readout allows selected impulses according to the amount of the multiplicand to flow out to the LH component lines designated 587LH and to the RH component lines designated 587RH (see also Fig. 29c). The lines 587LH and 587RH extend down to the various points 150 of the CS relays and the other points 151 of these relays connect to the LH lines 588LH and to the RH lines 588RH, which latter lines extend down through the IVC 1 to 16 contacts to the transfer lines 570 and thence via plug board 571 to the countermagnets 550RH of the RH accumulator. The 588LH lines in place of extending directly to the countermagnets of the LH accumulator extend to the RH 2 to 16 (Fig. 29d) contacts and such contacts when in the position shown in the circuit diagram allow the impulses flowing over the 588LH lines to flow directly to the countermagnets 550LH of the LH accumulator.

By the foregoing circuits the LH and RH components of partial products are entered into the LH and RH accumulators and as successive multiplying cycles ensue for successive columnar orders of the multiplier in which significant figures appear, there is a selected energization of the CS magnets to direct the entries into the proper and shifted orders of the accumulators.

After the multiplying computation is complete for the multiplication of A×B, the amount standing in the RH accumulator is transferred over to the LH accumulator. This is brought about by the energization of magnet 162RH (Fig. 29a) in the manner previously explained. Energization of 162RH shifts all the RH 1 to 16 contacts (Fig. 29d) to reverse position and subsequently upon the operation of emitter 153, impulses are emitted to the RHRO readout device and though the shifted RH 1 to 16 contacts to the lines 591 which extend over to the LH accumulator magnets 550LH. At the completion of an emission of impulses by the 153 emitter, the emitter brush encounters an extra spot and through contacts RHA now closed, energizes a relay magnet 162LH. Energization of 162LH trips open the contacts LHE, the opening of these contacts prevents a further transferring over operation. The complete product, together with the additional amount of C or the complement of such additional amount, is now standing in the LH accumulator and subsequently this resulting amount in the LH accumulator is read out to the punch selector magnets 592. This reading out is effected by means of the brush 314, which traverses the spots 312 and common conducting strip 313 in the manner previously explained. A circuit 593 provides D. C. supply for the common strip 313. While a result is being punched upon the card the result is also entered into the summary accumulator by means of emitter 154, which emits impulses through the LHRO readout device (Fig. 29e) to the summary result accumulator magnets 550SP. Current supply to the emitter 154 is provided through contacts RHD and LHA which are in series as shown and connected to A. C. line 563. It will be understood that RHD are closed by the energization of 162RH and LHA are closed by the energization of 162LH.

Supply of current for the punch selector common supply circuit 593 is provided at the proper time in the operation of the machine in the following manner.

Referring now to Fig. 29e, upon energization of 162LH, contacts LHC close. Then upon closure of cam contacts CC—3 current flows from 563 side of the D. C. line through LHC, through CC—3, via circuit path 594 to relay coil B and back to the other side of the D. C. line. Energization of B closes stick contacts B—1 providing a supply of current through contacts 299 to the circuit 593. A circuit 595 is also established to the punching magnet 596 through punch magnet contacts 597. This punching magnet 596 and punch contacts 597 are those customarily used in punching machines of this type.

Resetting of the MP and MC receiving devices is effected as follows. Referring to Fig. 29d, upon emitter 153 encountering the zero spot, current is supplied through contacts RHB which are closed upon the energization of 162RH. Current accordingly, flows from the 563 side of the A. C. line, through LHE, through the emitter 153, through RHB, through MP reset magnet 598 and MC reset magnet 599 and back to ground. Upon the reset of the MC accumulator contacts 158 (Figs. 1 and 29a) close in the manner previously explained. Closure of these contacts 158 energize the RH reset magnet 600 and the RH accumulator is then reset in the customary manner. Control of the reset of the LH accumulator is effected as follows. After punching upon closure of the last column P—2, relay magnet K is energized. Energization of relay K closes points K—1 (Fig. 29a) and upon closure of cam contacts CC—5, current flows through the LHD contacts which are now closed, through the LH reset magnet 601 and back to ground causing the LH accumulators to be reset. Energization of coil K also closes relay points K—2 (Fig. 29e) and energizes eject magnet 610 to eject the punched card from the punch. Reset of the summary accumulator SP is effected by the hand closing of contacts 602 which energizes the SP reset magnet 603 at the proper time in the cycle as controlled by cam contacts CC—5.

Referring to the timing diagram (Figs. 28 and 28a) this timing diagram shows the countercycles in which multiplication is effected, the cycle in which transfer from RH to LH is effected, the punching of products or results, the reset of the LH accumulator and further multiplying cycles. This particular timing diagram does not show the extra cycles involved in the beginning of an operation when a card is first introduced into the machine. The diagram does, however, show in Fig. 28a, the interrelation of the card feed cycle from the time it is being read after the machine reaches a continuous operation on a succession of cards.

It will be noted that the lines "IVC add" and "subtract" and the inked in spots in the second countercycle of Fig. 28a show the cyclic time in which the amount from the IVC counter is read over into the RH accumulator or the time in which the corresponding difference is read over to the RH accumulator. It is in the countercycle succeeding this entry or transfer over cycle from IVC that the LH and IVC counters are reset and it is in the following cycle after this that multiplication begins. The number of multiplying cycles is of course indeterminate depending upon the number of significant places in the multiplier as is usual in these machines.

Summarizing, the present machine is adapted to derive factors A, B and C from a record card. According to the setting of switches the amount C can be added to the product of A×B or subtracted from this product of A×B. The operation is performed automatically after the switches have been set according to the kind of computation which the machine is to perform. After the result of the complete computation of A×B plus or minus C is entered into the final LH accumulator, the machine automatically punches back upon the record card from which the factors were derived, the result of the A×B plus or minus C computation. It then proceeds with a new computation on a succeeding card all automatically by the operation of the machine.

The machine can also be used for simple A×B computations. This sort of an operation is brought about by placing the switches S—1 and S—2 in intermediate position between the plus or minus positions shown on the circuit diagram.

The correlation of cycles of the machine is such that no additional machine time is required for the entry of the amounts C into the RH accumulator. This entry of the amount C into the RH accumulator is effected during a time which is required for card handling purposes and at which time the RH accumulator is receiving no other entry. So far as the RH accumulator is concerned this is accordingly an idle cycle of operation of this accumulator and this idle cycle is utilized for the introduction of the supplementary amount thereinto.

Heretofore, in the specification and hereinafter in the claims, various forms of relay devices have been and will be referred to. Some of these relays are of purely electrical type such as the Y relays. Other relays are of the electromagnetically tripped but mechanically controlled and restored multi-contact type. Such relays are used for multiplier selection and column shift purposes and are of the type shown in Figs. 6 to 12 of the drawings. Other relays are of the type shown in Figs. 13 to 15 inclusive which relays are electromagnetically tripped and mechanically restored and relatched.

Hereinafter, when the word "sum" is used in the claims, such sum is to be construed broadly as covering a sum such as (A×B)+C or (A×B)−C. The word "sum" as so used, does not necessarily imply or connote selectively as to the sign of the C term. If either computation alone is effected, the result is a sum. When selectivity of a plus or minus operation is intended to be expressed, means will be recited calling for such selected control. In short, the sum may be obtained of positive or negative amounts or positive and positive amounts without implying the capability of securing a selectivity as to a plus or minus introduction of the third term. Accordingly, sum is used generically.

What I claim is:

1. A multiplying machine including multiplying means for multiplying a multiplicand by a multiplier, an accumulator for left hand components of partial products, an accumulator for right hand components of partial products, an entry receiving device receiving an entry supplemental to the multiplier and multiplicand which enter into a multiplying computation, means for transferring over said supplemental entry from the said entry receiving device into one of the aforesaid component accumulators, means for entering partial product component amounts which are derived as a result of a multiplying computation into both of the aforesaid accumulators and means for transferring over from one accumulator to the other the amount standing in such accumulator.

2. A record controlled accounting machine comprising a power driven main operating mechanism, three entry receiving means for three separate terms, said entry receiving means being operated by the said operating mechanism, result receiving means also operated thereby, means for effecting entry of all of said terms into said entry receiving means upon one cycle of operation of the main operating mechanism, means for entering one term from the entry receiving means into a part of the result receiving means automatically upon the following cycle of operation of the main operating mechanism, and multiplying means controlled by the other entry receiving means for multiplying the other terms together and effecting automatic entry of product results into result receiving means upon the following and further cycles of operation of the main operating mechanism.

3. An accounting machine of the record controlled type, including entry receiving means receiving from a record the amount of the multiplier, the amount of the multiplicand, and a supplemental amount, final result receiving means, means controlled by the foregoing entry receiving means for multiplying the multiplier and the multiplicand and for setting up the product in the result receiving means, transfer means controlled by the supplemental amount receiving means for causing the introduction of the supplemental amount into the result receiving means, and means for controlling said last mentioned transfer means so that the supplemental amount is either additively or subtractively entered whereby the final result receiving means ultimately receives an amount representative of the product with the supplemental amount derived from the record added to or subtracted therefrom 4. An accounting machine with a record controlled means for receiving A and B terms, multiplying means controlled thereby for effecting A×B computations and result receiving means receiving entries related to the product and under control of the foregoing multiplying means, a supplemental entry receiving means receiving a supplemental amount C from the same record from which the A and B factors were derived, transfer means including means controlled by the supplemental amount receiving means, and cooperating through intervening means, for causing the result receiving means to be influenced additively or subtractively in accordance with the supplemental amount, and means for selectively controlling the foregoing transfer means controlled by the supplemental amount receiving means to cause either an additive or subtractive entry of such supplemental amount, whereby the result receiving means receives a final setting representative of A×B plus or minus C.

5. An accounting machine with factor manifesting means for two factors, multiplying devices controlled thereby and of the partial products creating type for multiplying two factors, result receiving means controlled thereby, entry receiving means for a supplemental amount, a main operating mechanism, and means operating automatically and under the control of the main operating mechanism for causing a multiplying operation by said multiplying devices and controlling the receiving means in accordance with such multiplication and transfer means operating automatically under the control of the main operating mechanism for transferring the supplemental amount which is in the supplemental amount receiving means into the result receiving means, a selective control for the transfer means whereby additive or subtractive entries may be made of the supplemental amount into the result receiving means whereby two factors may be multiplied and an additional supplemental amount algebraically added to the product and the final single result set up upon the result receiving means wholly automatically by the operation of the machine.

6. An accounting machine with entry receiving means provided for the concurrent entry of three separate multi-numerical terms thereinto all of said receiving means being of the multi-denominational type and capable of receiving entries concurrently in a plurality of orders, automatically operable term calculating means controlled by the foregoing entry receiving means, and including multiplying means controlled by two of the entry receiving means, and means controlled by the other entry receiving means for introducing the third term into the result receiving means to provide a single final numerical result which is the sum of said third term and the product provided by the multiplication of the other two terms, and means including control means for bringing about the operation of the term calculating means, the multiplying means and the introducing means entirely automatically by a single initiated machine operation to obtain the aforesaid final single result.

7. An accounting machine of the record controlled type for deriving three separate terms from a common record, and for affecting a calculation based upon all three of the terms. and for recording a final single result upon the record from which the terms were derived, comprising entry receiving means, means for entering all of the terms from the common record into the entry receiving means of the machine, term computing means controlled by the aforesaid entry receiving means, and including result receiving means and multiplying means for multiplying two terms and entering component results of the multiplication into the result receiving means and means for entering a third term into the result receiving means to provide a single final numerical result, which is the sum of said third term and the product.

8. An accounting machine with entry receiving means upon which three separate multi-numeral terms of a to be performed computation may stand concurrently, all of said receiving means being of the multi-denominational type and capable of receiving entries concurrently in a plurality of orders, means for causing such terms to be concurrently entered in all three receiving means at the beginning of a computation, amount manifesting means, one portion of which constitutes the result receiving means, multiplying means and means for obtaining a setting of a final single result on the result receiving means, said means comprising means for entering different amount entries into amount manifesting means in noninterfering relation, including means for entering entries thereinto from one entry receiving means and means for also entering entries into amount manifesting means under the control of the aforesaid multiplying means, which multiplying means are in turn under the control of the other two entry receiving means and means including control means for effecting automatic operation of the aforesaid means in proper sequence, whereby a final result may be obtained which comprises the sum of the product of two terms and the third term.

9. A combined multiplying and adding machine for automatically multiplying A×B and for automatically in the same calculation adding a term C to the product of A×B, said machine comprising entry receiving means for the three terms A, B and C, all of said receiving means being of the multi-denominational type and capable of receiving entries in various orders concurrently, result receiving means, means for automatically entering the C term from the C entry receiving means into the result receiving means of the machine, multiplying means for multiplying A×B and for directing the entry of product results into result receiving means and thereby setting up a final result of A×B with C added thereto upon the final result receiving means of the machine and control means for said multiplying means which is automatically effective after the entry of the C term into the result receiving means for automatically initiating multiplying.

10. An accounting machine with entry receiving means upon which three separate multi-numeral terms of a computation may stand concurrently, entry causing means brought into operation by the machine operating means, amount manifesting means, one portion of which constitutes result receiving means, multiplying means, means for obtaining a setting of a final single result upon the result receiving means, said means comprising means for entering sets of entries into the amount manifesting means of the machine, said last mentioned means including means to enter one set of entries thereinto from one entry receiving means and under its control, control means for said last mentioned means whereby such entry may be effected additively or subtractively and means for entering another set of entries thereinto under the control of the multiplying means, which multiplying means is under the control of the other two entry receiving means, means for causing the aforesaid sets of entries to be entered into the amount manifesting means in non-interfering relation, means for causing the algebraic sum of the introduced entries to be finally set up upon the result receiving means and means including control means automatically brought into operation by the aforesaid machine operating means for effecting automatic and proper sequential operation of the entry receiving and entry causing means, result receiving means, the multiplying means, the setting means and entering means in proper automatic sequence whereby in one single initiated automatic machine operation the three terms may be computed together into a final single result which represents the product of the two terms with the product algebraically added to the third term.

11. In an accounting machine having record handling and record reading means, record controlled receiving means for terms A and B, both receiving such terms which may be in multi-denominational form from a record, multiplying means controlled thereby and result receiving means for computed results calculated by the multiplying means and including in combination record controlled receiving means for a third C term, which also may be in multi-denominational form and derived from the record affording terms A and B means controlled by said last named means to cause the C term to be entered into the result receiving means which receives the computed results whereby a final result comprising the sum of the product of A and B and the C term is upon the result receiving means initiating and operating causing control means for all of the aforesaid means including controls brought into operation automatically by means timed with each of the aforesaid means upon each means completing its respective operation for initiating and causing operation of the aforesaid means which is next to operate, whereby all of the operations of all of the aforesaid means are brought about in automatic succession with automatic initiation of all operations and without manual intervention.

12. In an accounting machine having record handling and record reading means, record controlled receiving means for terms A and B, multiplying means controlled thereby and result receiving means for computed results calculated by the multiplying means and including in combination record controlled receiving means for a third C term, means controlled by said last named means to cause the complement of the C term to be entered in the result receiving means which receives the computed results whereby a final result comprising the product of A and B diminished by the C term is upon the result receiving means initiating and operating causing control means for all of the aforesaid means including controls brought into operation automatically by means timed with each of the aforesaid means upon each means completing its respective operation for initiating and causing operation of the aforesaid means which is next to operate, whereby all of the operations of all of the aforesaid means are brought about in automatic succession with automatic initiation of all operations and without manual intervention.

13. A record controlled accounting machine comprising a power driven operating mechanism, three entry receiving means for three separate terms, said entry receiving means being operated by said operating mechanism, result receiving means also operated thereby, means for effecting entry of all of said terms into said entry receiving means concurrently and in one cycle of operation of the main operating mechanism, means for entering the complement of the third term from the entry receiving means into a part of the result receiving means automatically upon the following cycle of operation of the main operating mechanism, and multiplying means controlled by the other entry receiving means for multiplying the other terms together and effecting automatic entry of product results into result receiving means upon the following and further cycle of operation of the main operating mechanism whereby the final result consisting of the product of the first two terms diminished by the third term is obtained.

14. In an accounting machine having separate receiving means for terms A and B, multiplying means controlled thereby and result receiving means for computed results calculated by the multiplying means and including in combination another receiving means for a third C term, means for concurrently entering all three terms into their respective receiving means, means controlled by said C term receiving means to cause the C term to be entered subtractively in the result receiving means which receives the computed results by entries concurrently directed into different orders thereof whereby a final result comprising the sum of the product of A and B diminished by the C term is upon the result receiving means.

15. In an accounting machine with entry receiving means for three separate multi-numerical terms, means for effecting a concurrent entry of said three terms thereinto, automatically operable term calculating means controlled by the foregoing entry receiving means, and including multiplying means controlled by two of the entry receiving means, result receiving means, and means controlled by the other entry receiving means for introducing the third term subtractively into the result receiving means to provide a single final numerical result which consists of the product of the first two terms diminished by the third term and means including the control means for bringing about the operation of the term calculating means, the multiplying means and the introducing means entirely automatically by a single initiated machine operation to obtain the aforesaid single final result.

16. In an accounting machine with entry receiving means for three separate multi-numerical terms, means for effecting a concurrent entry of said three terms thereinto, automatically operable term calculating means controlled by the foregoing entry receiving means, and including multiplying means controlled by two of the entry receiving means, result receiving means, and means controlled by the other entry receiving means for introducing the third term subtractively into the result receiving means, means for controlling the last mentioned means whereby the third term is additively or subtractively entered in the result receiving means to provide a single final numerical result which is the algebraic sum of said third term and the product, and means including control means for bringing about the operation of the term calculating means, the multiplying means and the introducing means entirely automatically by a single initiated operation followed by further automatically initiated operations to obtain the aforesaid final single result.

17. An accounting machine including entry receiving means for three multi-numeral terms A, B and C, which receiving means during a computation employing such terms maintains a setting of all such terms after the entry thereinto, means for entering such terms thereinto, multiplying means controlled by the A and B term receiving means, said multiplying means having result receiving means receiving computed results, means controlled by the C term entry receiving means for causing the entry of an amount based upon the C term into the result receiving means, and means including control means for causing automatic operation of the term receiving means, the entering means, the aforesaid last mentioned means and the multiplying means in proper sequence whereby the terms are entered the amount based upon the C term and the computed results of A×B are introduced automatically into the receiving means in non-interfering relation and a final result obtained which comprises the sum of the product of A×B and an amount based upon the C term by a singly initiated operation and with succeeding operations automatically initiated by the control means.

18. An accounting machine with factor manifesting means for two factors, multiplying devices controlled by said manifesting means for multiplying two factors, result receiving means in part controlled by the foregoing devices, means including supplemental amount receiving means, means controlled by said last named means for causing entries to be made into the result receiving means, said last named means having selective control means to cause either a true supplemental amount or a true complement of the supplemental amount to be entered into the result receiving means whereby the final setting of the result receiving means is changed and whereby the receiving means will have finally set up thereon a product of a computation increased or diminished by said true figure supplemental amount, a main operating mechanism, operating control parts for controlling the sequence and initiation of operations of the aforesaid means, said control parts being under the control of the main operating mechanism and causing all operations of the aforesaid means to be brought about in automatic succession without manual intervention, so that by a single initiated automatic operation two factors may be multiplied and the result increased or diminished by another factor.

JAMES W. BRYCE.